(12) United States Patent
Filler

(10) Patent No.: US 10,210,502 B2
(45) Date of Patent: Feb. 19, 2019

(54) METHODS AND ARRANGEMENTS FOR DEVICE TO DEVICE COMMUNICATION

(71) Applicant: Digimarc Corporation, Beaverton, OR (US)

(72) Inventor: Tomas Filler, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/096,112

(22) Filed: Apr. 11, 2016

(65) Prior Publication Data

US 2017/0024723 A1 Jan. 26, 2017

Related U.S. Application Data

(63) Continuation of application No. 14/180,277, filed on Feb. 13, 2014, now Pat. No. 9,311,640.
(Continued)

(51) Int. Cl.
*G06T 1/00* (2006.01)
*G06Q 20/32* (2012.01)
(Continued)

(52) U.S. Cl.
CPC ....... *G06Q 20/3274* (2013.01); *G06F 3/0412* (2013.01); *G06F 3/0486* (2013.01);
(Continued)

(58) Field of Classification Search
None
See application file for complete search history.

(56) References Cited

U.S. PATENT DOCUMENTS 5,983,383 A 11/1999 Wolf
6,122,403 A 9/2000 Rhoads
(Continued)

FOREIGN PATENT DOCUMENTS

WO WO2014041381 3/2014
WO WO2014134180 9/2014
WO WO2014199188 12/2014

OTHER PUBLICATIONS

International Search Report and Written Opinion dated Oct. 28, 2014 from PCT/US14/18715 (corresponding to WO2014134180).
(Continued)

*Primary Examiner* — Utpal D Shah
(74) *Attorney, Agent, or Firm* — Digimarc Corporation

(57) ABSTRACT

The disclosure relates, e.g., to image processing technology including device to device communication. One claim recites an apparatus comprising: a camera for capturing imagery; and one or more processors configured for: analyzing a plurality of image frames captured with said camera, the plurality of image frames representing a plurality of graphics displayed on a display screen of a portable device, in which each of the graphics comprises an output from an erasure code generator, in which the erasure code generator produces a plurality of outputs corresponding to a payload; analyzing the plurality of image frames to decode outputs from the plurality of graphics; reconstructing the payload from decoded outputs; and utilizing the payload to carry out an action. A great variety of other features, arrangements and claims are also detailed.

24 Claims, 16 Drawing Sheets

Related U.S. Application Data

(60) Provisional application No. 61/938,673, filed on Feb. 11, 2014.

(51) Int. Cl.
    *G06Q 20/36*      (2012.01)
    *G06F 3/041*      (2006.01)
    *H04L 9/00*       (2006.01)
    *G06Q 20/38*      (2012.01)
    *G06F 3/0486*     (2013.01)
    *G06F 3/0488*     (2013.01)
    *G06F 3/0484*     (2013.01)

(52) U.S. Cl.
    CPC ...... *G06F 3/04842* (2013.01); *G06F 3/04883* (2013.01); *G06Q 20/32* (2013.01); *G06Q 20/36* (2013.01); *G06Q 20/367* (2013.01); *G06Q 20/382* (2013.01); *G06T 1/0021* (2013.01); *H04L 9/00* (2013.01)

(56) References Cited

U.S. PATENT DOCUMENTS

| | | |
|---|---|---|
| 6,307,487 B1 | 10/2001 | Luby |
| 6,590,996 B1 | 7/2003 | Reed et al. |
| 6,614,914 B1 | 9/2003 | Rhoads et al. |
| 7,020,304 B2 | 3/2006 | Alattar et al. |
| 7,024,016 B2* | 4/2006 | Rhoads .............. G06K 9/00442 |
| | | 375/E7.089 |
| 7,068,729 B2 | 6/2006 | Shokrollahi et al. |
| 7,123,740 B2 | 10/2006 | McKinley et al. |
| 7,191,156 B1 | 3/2007 | Seder |
| 7,370,190 B2 | 5/2008 | Calhoon |
| 7,412,641 B2 | 8/2008 | Shokrollahi |
| 7,486,827 B2 | 2/2009 | Kim |
| 7,508,954 B2 | 3/2009 | Lev |
| 7,721,184 B2* | 5/2010 | Luby .................. H03M 13/03 |
| | | 714/781 |
| 7,924,761 B1 | 4/2011 | Stevens |
| 7,971,129 B2* | 6/2011 | Watson ............... H03M 13/03 |
| | | 365/200 |
| 8,006,160 B2 | 8/2011 | Chen et al. |
| 8,103,877 B2 | 1/2012 | Hannigan et al. |
| 8,224,731 B2 | 7/2012 | Maw et al. |
| 8,250,660 B2 | 8/2012 | Levy et al. |
| 8,256,665 B2* | 9/2012 | Rhoads .............. G06F 17/30876 |
| | | 235/375 |
| 8,423,457 B1 | 4/2013 | Schattauer et al. |
| 8,429,407 B2 | 4/2013 | Os et al. |
| 8,526,024 B2 | 9/2013 | Fukushima |
| 8,750,556 B2 | 6/2014 | McKinley et al. |
| 8,868,039 B2 | 10/2014 | Rodriguez |
| 8,970,733 B2 | 3/2015 | Faenger |
| 8,971,567 B2 | 3/2015 | Reed et al. |
| 8,972,824 B1 | 3/2015 | Northcott et al. |
| 9,022,291 B1 | 5/2015 | van der Merwe et al. |
| 9,022,292 B1 | 5/2015 | van der Merwe et al. |
| 9,054,742 B2 | 6/2015 | Kwok |
| 9,311,639 B2 | 4/2016 | Filler |
| 9,311,640 B2 | 4/2016 | Filler |
| 2002/0044659 A1 | 4/2002 | Ohta |
| 2002/0095389 A1* | 7/2002 | Gaines ............... G06Q 20/04 |
| | | 705/67 |
| 2007/0253594 A1 | 11/2007 | Lu et al. |
| 2007/0300127 A1 | 12/2007 | Watson et al. |
| 2008/0062141 A1 | 3/2008 | Chandhri |
| 2008/0174570 A1 | 7/2008 | Jobs et al. |
| 2008/0317278 A1 | 12/2008 | Lefebvre |
| 2009/0216910 A1 | 8/2009 | Duchesneau |
| 2009/0276344 A1 | 11/2009 | Maw |
| 2009/0307132 A1* | 12/2009 | Phillips ............... G06Q 20/105 |
| | | 705/41 |
| 2010/0082444 A1 | 4/2010 | Lin et al. |
| 2010/0125495 A1 | 5/2010 | Smith et al. |
| 2010/0138344 A1* | 6/2010 | Wong ................ G06Q 20/10 |
| | | 705/44 |
| 2010/0150434 A1 | 6/2010 | Reed |
| 2011/0029370 A1 | 2/2011 | Roeding et al. |
| 2011/0119156 A1 | 5/2011 | Hwang et al. |
| 2011/0141276 A1 | 6/2011 | Borghei |
| 2011/0161076 A1 | 6/2011 | Davis et al. |
| 2011/0212717 A1 | 9/2011 | Rhoads et al. |
| 2011/0274310 A1 | 11/2011 | Rhoads |
| 2012/0024945 A1 | 2/2012 | Jones |
| 2012/0046071 A1 | 2/2012 | Brandis et al. |
| 2012/0123959 A1 | 5/2012 | Davis et al. |
| 2012/0166333 A1 | 6/2012 | Von Behren et al. |
| 2012/0214515 A1 | 8/2012 | Davis et al. |
| 2012/0278155 A1 | 11/2012 | Faith |
| 2012/0284012 A1 | 11/2012 | Rodriguez et al. |
| 2012/0290449 A1* | 11/2012 | Mullen .................. G06Q 10/00 |
| | | 705/27.2 |
| 2012/0303425 A1 | 11/2012 | Katzin et al. |
| 2012/0310826 A1* | 12/2012 | Chatterjee .............. G06Q 20/36 |
| | | 705/41 |
| 2012/0310836 A1 | 12/2012 | Eden et al. |
| 2013/0085941 A1 | 4/2013 | Rosenblatt et al. |
| 2013/0223673 A1 | 8/2013 | Davis et al. |
| 2014/0142958 A1 | 5/2014 | Sharma et al. |
| 2014/0164124 A1 | 6/2014 | Rhoads |
| 2014/0212142 A1* | 7/2014 | Doniec .................. H04B 13/02 |
| | | 398/104 |
| 2014/0244494 A1 | 8/2014 | Davis et al. |
| 2014/0244495 A1 | 8/2014 | Davis et al. |
| 2014/0258110 A1 | 9/2014 | Davis et al. |
| 2014/0372198 A1* | 12/2014 | Goldfinger ............... G07G 1/14 |
| | | 705/14.33 |
| 2015/0058200 A1 | 2/2015 | Inotay et al. |
| 2015/0227922 A1 | 8/2015 | Filler |

OTHER PUBLICATIONS

Claims 1-15 from European patent application No. 14709848.7, which is the European regional phase of PCT application No. PCT/US2014/018715 (corresponding to WO2014134180).

Supplementary Search Report and Written Opinion dated Jul. 13, 2016 from European patent application No. 14709848.7, which is the European regional phase of PCT application No. PCT/US2014/018715 (corresponding to WO2014134180).

Sep. 7, 2016 Final Rejection and Interview Summary, Jun. 6, 2016 Supplemental Response, Apr. 18, 2016 Amendment, Dec. 17, 2015 non-final Rejection, all from assignee's U.S. Appl. No. 14/074,072 (published as US 20140258110 A1).

MacKay D (2005) Fountain codes. IEE Proc Commun 152(6):1062-1068.

Korus et al., "A new approach to high-capacity annotation watermarking based on digital fountain codes," Multimedia Tools and Applications, Jan. 2014, vol. 68, Issue 1, pp. 59-77 (this paper states that it was published online in Feb. 2012).

Byers et al. "Accessing Multiple Minor Sites in Parallel: Using Tornado Codes to Speed Up Downloads," Proceeding IEEE Infocom. The Conference on Computer Communications, US New York, (Mar. 21, 1999) pp. 275-283.

Byers et al., "A Digital Fountain Approach to Reliable Distribution of Bulk Data," International Computer Science Technical Report TR-98-013 (May 1998).

Jul. 29, 2015 non-final Office Action, and Sep. 14, 2015 Amendment; both from assignee's U.S. Appl. No. 14/180,218 (published as US 2015-0227922 A1).

Jul. 29, 2015 non-final Office Action, and Sep. 14, 2015 Amendment; both from assignee's U.S. Appl. No. 14/180,277 (published as U.S. Appl. No. 2015-0227925 A1).

Liu et al., "VCode-Pervasive Data Transfer Using Video Barcode," IEEE Trans. on Multimedia, vol. 10, No. 3, pp. 361-371, Apr. 2008.

Korus, "A new approach to high-capacity annotation watermarking based on digital fountain codes", Multimedia Tools and Applications, vol. 68, No. 1, pp. 59-77, Feb. 2012.

(56) References Cited

OTHER PUBLICATIONS

He, "High-Fidelity Data Embedding for Image Annotation", IEEE Transactions on Image Processing, vol. 15, No. 2, Feb. 2009, pp. 429-435.
Schott, "AnnoWaNO: An annotation watermarking framework", Image and Signal Processing and Analysis, ISPA 2009. Proceedings of 6$^{th}$ International Symposium on IEEE, pp. 483-488.
Bloisi, et al., "Image Based Steganography and Cryptography," VISAPP, Mar. 8, 2007, pp. 127-124.
Claims 1-15, as amended on Feb. 9, 2017, from European patent application No. 14709848.7, which is the European regional phase of PCT application No. PCT/US2014/018715 (corresponding to WO2014134180).
Aug. 28, 2018 Applicant Reponse to Feb. 21, 2018 Examination Report from European patent application No. 14709848.7, which is the European regional phase of PCT application No. PCT/US2014/018715 (corresponding to WO2014134180).
Claims 1-15, as amended on Aug. 28, 2018, from European patent application No. 14709848.7, which is the European regional phase of PCT application No. PCT/US2014/018715 (corresponding to WO2014134180).
Feb. 21, 2018 Examination Report from European patent application No. 14709848.7, which is the European regional phase of PCT application No. PCT/US2014/018715 (corresponding to WO2014134180).

\* cited by examiner

```
Dave's Killer Bread              2.79
Chicken of the Sea Tuna          2.99
Fage Greek Yogurt                 .69
Ponzi Pinot Gris                13.99
Oscar Meyer Bacon                4.47
   Rewards discount          -.99
Quaker Oats                      1.99
Red Bull 4-pack                  7.67
Meyer Lemons (4@.49 ea)          1.96
Delicata Squash (.79/lb)         3.42
```

FIG. 12A

```
Chicken of the Sea Tuna          2.99
Dave's Killer Bread              2.79
Delicata Squash (.79/lb)         3.42
Fage Greek Yogurt                 .69
Meyer Lemons (4@.49 ea)          1.96
Oscar Meyer Bacon                4.47
   Rewards discount          -.99
Ponzi Pinot Gris                13.99
Quaker Oats                      1.99
Red Bull 4-pack                  7.67
```

FIG. 12B

```
Ponzi Pinot Gris                13.99
Red Bull 4-pack                  7.67
Oscar Meyer Bacon                4.47
   Rewards discount          -.99
Delicata Squash (.79/lb)         3.42
Chicken of the Sea Tuna          2.99
Dave's Killer Bread              2.79
Quaker Oats                      1.99
Meyer Lemons (4@.49 ea)          1.96
Fage Greek Yogurt                 .69
```

FIG. 12C

```
LISTED
Chicken of the Sea Tuna          2.99
Delicata Squash (.79/lb)         3.42
Fage Greek Yogurt                 .69
Meyer Lemons (4@.49 ea)          1.96
Ponzi Pinot Gris                13.99
Quaker Oats                      1.99
-----------------------------------
MISSING
Newman's Marinara
-----------------------------------
OTHER
Dave's Killer Bread              2.79
Oscar Meyer Bacon                4.47
   Rewards discount          -.99
Red Bull 4-pack                  7.67
```

FIG. 12D

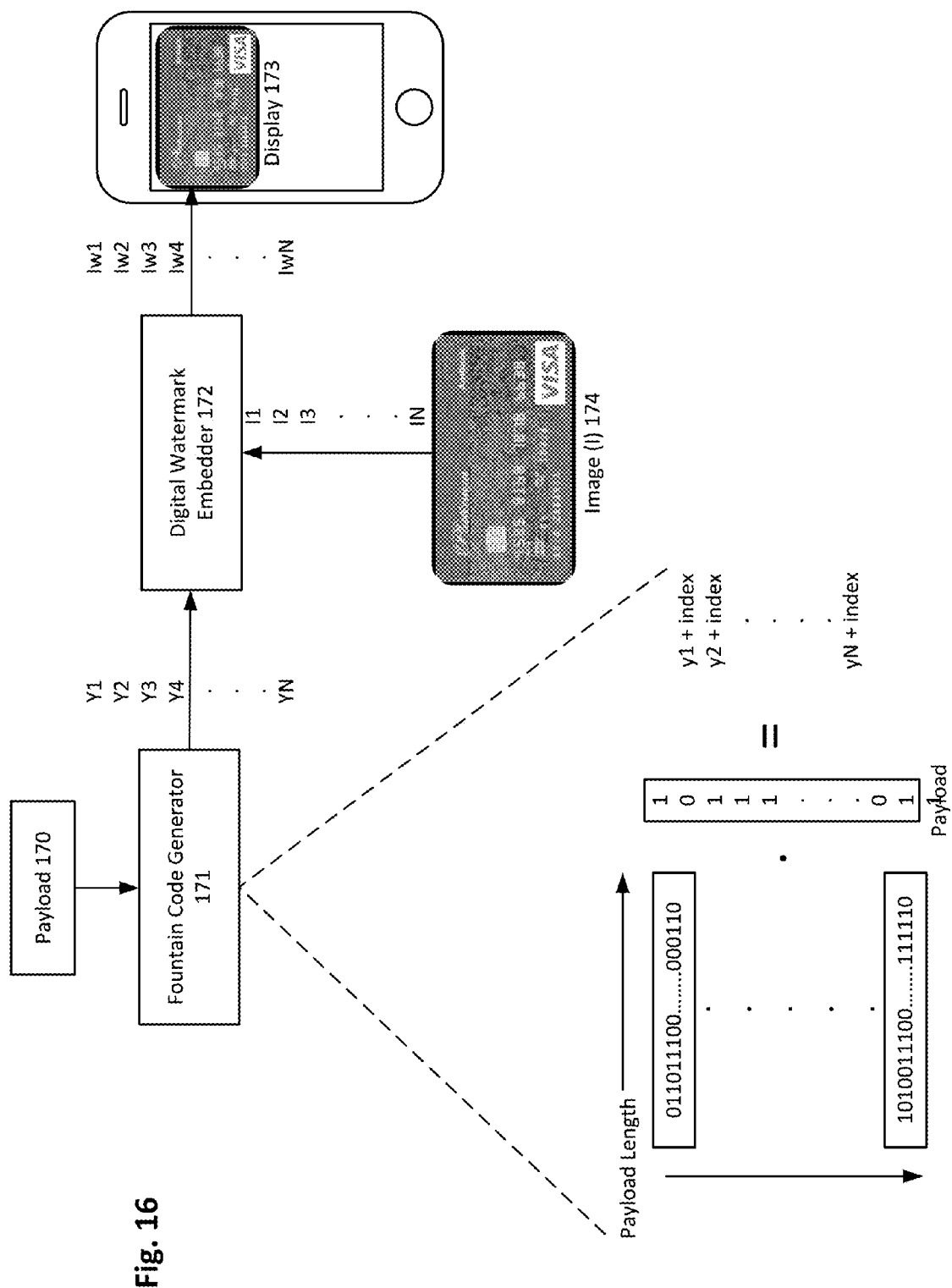

METHODS AND ARRANGEMENTS FOR DEVICE TO DEVICE COMMUNICATION

RELATED APPLICATION DATA

This application is a continuation of U.S. patent application Ser. No. 14/180,277, filed Feb. 13, 2014 (now U.S. Pat. No. 9,311,640), which claims the benefit of U.S. Patent Application No. 61/938,673, filed Feb. 11, 2014, which are hereby incorporated herein by reference in their entirety. This application is also related to U.S. Provisional Application Nos. 61/825,059, filed May 19, 2013, and 61/769,701, filed Feb. 26, 2013; and U.S. patent application Ser. No. 14/074,072, published as US 2014-0258110 A1, filed Nov. 7, 2013, Ser. No. 13/873,117, issued as U.S. Pat. No. 9,830,588, filed Apr. 29, 2013, and Ser. No. 13/792,764, published as US 2014-0244494 A1, filed Mar. 11, 2013. Each of the above patent documents is hereby incorporated herein by reference in its entirety.

TECHNICAL FIELD

The present technology concerns, e.g., portable devices such as smartphones, and their use in making secure payments or facilitating transactions. The present technology also concerns payload transmission with portable devices.

BACKGROUND AND INTRODUCTION TO THE TECHNOLOGY

Desirably, shoppers should be able to select from among plural different credit cards when making purchases, and not be tied to a single payment service. Having a variety of credit card payment options provides a variety of advantages.

For example, some credit card providers offer promotions that make spending on one card more attractive than another (e.g., double-miles on your Alaska Airlines Visa card for gas and grocery purchases made during February). Other promotions sometime include a lump-sum award of miles for new account holders after a threshold charge total has been reached (e.g., get 50,000 miles on your new CapitalOne Visa card after you've made $5,000 of purchases within the first five months.) At still other times, a shopper may be working to accumulate purchases on one particular card in order to reach a desired reward level (e.g., reaching 50,000 miles to qualify for a Delta ticket to Europe).

The ability to easily select a desired card from among an assortment of cards is a feature lacking in many existing mobile payment systems. The legacy physical cards that embody the service provider brands and their capabilities are expensive to produce and have security weakness that can be mitigated in mobile payment systems. The look, feel, and user interfaces for physical cards are familiar and well understood. Existing mobile payments solutions involve numerous changes and new learning to operate.

In accordance with one aspect of the present technology, a smartphone programmed with a virtual wallet provides a user interface to present a wallet of virtual credit cards from which a user can pick when making a purchase. Data is conveyed optically from the phone to a cooperating system, such as a point of sale terminal or another smartphone. Preferably, the phone containing the virtual cards presents a graphical illustration of the selected card on the screen. Hidden in this graphical illustration (i.e., steganographically encoded) is transaction data. This transaction data may provide information about the selected card, and may also provide context data used to create a session key for security. Of course, a virtual wallet may receive payments, credits and rewards, as well as initiate payments.

Through use of the present technology, merchants can obtain the digital security advantages associated with "chip card"-based payment systems, without investing in interface hardware that has no other use, using virtual cards that have no costs of manufacture and distribution. The technology is secure, easy, economical, and reliable.

The foregoing and other features and advantages of the present technology will be more readily apparent from the following detailed description, which proceeds with reference to the accompanying drawings.

BRIEF DESCRIPTION OF THE DRAWINGS

FIGS. 12A-12D show how checkout tallies can be customized per user preference.

FIG. 16 is a diagram showing a payload coding and transmission scheme.

DETAILED DESCRIPTION

The present technology has broad applicability, but necessarily is described by reference to a limited number of embodiments and applications. The reader should understand that this technology can be employed in various other forms—many quite different than the arrangements detailed in the following discussion.

One aspect of the present technology concerns payment technologies, including auctions to determine which financial vendor will facilitate a transaction. A few particular embodiments are described below, from which various features and advantages will become apparent.

One particular method employs a user's portable device, such as a smartphone. As is familiar, such devices include a variety of components, e.g. a touch screen display, a processor, a memory, various sensor modules, etc.

Figure 1:
FIGS. 1 and 2 show a fliptych user interface used in certain embodiments to allow a user to select a desired card from a virtual wallet.
Figure 2:
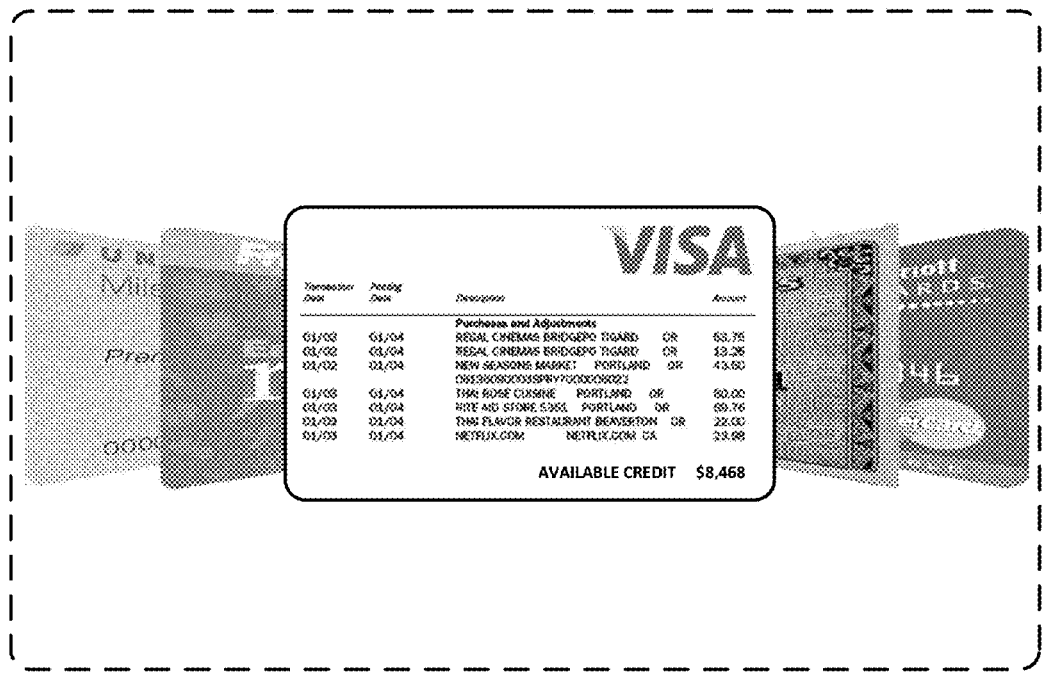

Stored in the memory is an electronic payment module comprising software instructions that cause the device to present a user interface (UI) on the display. This electronic payment module (and/or a UI provided by such) is sometimes referred to herein as a "virtual wallet". One such user interface is shown in FIG. 1. The depicted user interface shows graphical representations of plural different cards of the sort typically carried in a user's wallet, e.g., credit cards, shopping loyalty cards, frequent flier membership cards, etc. ("wallet cards"). The software enables the user to scroll through the collection of cards and select one or more for use in a payment transaction, using a fliptych arrangement. (Fliptych is the generic name for the style of interface popularized by Apple under the name "Cover Flow.") As earlier noted, it is advantageous for a shopper to be able to choose different of the displayed payment cards at different times, and not be virtually tied to a single payment service.

In the illustrated embodiment, after the user has scrolled to a desired card (a Visa card in FIG. 1), it is selected for use in the transaction by a user signal, such as a single-tap on the touch screen. (A double-tap causes the depicted card to virtually flip-over and reveal, on its back side, information about recent account usage and available credit.)

Figure 3A:
FIGS. 3A and 3B show alternative card selection user interfaces.

A great variety of other user interface styles can be used for selecting from a virtual wallet of cards. FIG. 3A shows another form of UI—a scrollable display of thumbnails. This UI illustrates that representations of cards other than faithful card depictions can be employed. (Note the logo, rather than the card image, to represent the MasterCard payment service).

Figure 3B:

Still another alternative UI for card selection is that employed by Apple's Passbook software, shown in FIG. 3B. (The Passbook app is an organizer for passes such as movie tickets, plane and train boarding passes, gift cards, coupons, etc.)

After the user has selected a payment card, the device may perform a user security check—if required by the card issuer or by stored profile data configured by the user. One security check is entry of a PIN or password, although there are many others.

The illustrative transaction method further involves generating context-based authentication data using data from one or more smartphone sensors, as discussed more fully below. This authentication data serves to assure the cooperating system that the smartphone is legitimate and is not, e.g., a fraudulent "replay attack" of the system.

Figure 4A:
FIG. 4A shows artwork for a selected card, steganographically encoded with card and authentication information, displayed on a smartphone screen for optical sensing by a cooperating system.

After the security check (if any), and generation of the context-based authentication data, the smartphone displays corresponding artwork on its display, as shown in FIG. 4A. This artwork visually indicates the selected payment service, thereby permitting the user to quickly check that the correct payment card has been selected. The card number, a logo distinctive of the selected payment service (e.g., an American Express, Visa or MasterCard logo) and/or card issuer (e.g., US Bank, Bank of America) can be included in the artwork, for viewing by the user.

Figure 4B:
FIG. 4B is similar to FIG. 4A, but uses overt machine readable encoding (i.e., a barcode) instead of steganographic encoding, to optically convey information to the cooperating system.

While the smartphone display shown in FIG. 4A indicates the selected payment service, it also includes the payment service account data (e.g., account number, owner name, country code, and card expiration date), as well as the context-based authentication data. This information is not evident in the FIG. 4A artwork because it is hidden, using steganographic encoding (digital watermarking). However, such information can be decoded from the artwork by a corresponding (digital watermark) detector. Alternatively, such information can be conveyed otherwise, such as by other forms of machine-readable encoding (e.g., the barcode shown in FIG. 4B).

The user shows the artwork on the phone display to a sensor (e.g., a camera) of a cooperating system, such as a point of sale (POS) terminal, or a clerk's portable device, which captures one or more frames of imagery depicting the display. In one particular case the user holds the smartphone in front of a fixed camera, such as at a self-checkout terminal. In another, a POS terminal camera, or a smartphone camera, is positioned (e.g., by a checkout clerk) so as to capture an image of the smartphone screen. In still another, the user puts the smartphone, display facing up, on a conveyor of a grocery checkout, where it is imaged by the same camera(s) that is used to identify products for checkout. In all such arrangements, information is conveyed optically from the user device to the cooperating system. (Related technology is detailed in applicant's pending application Ser. No. 13/750,752, issued as U.S. Pat. No. 9,367,770, filed Jan. 25, 2013, which is hereby incorporated herein by reference in its entirety)

Figure 5:
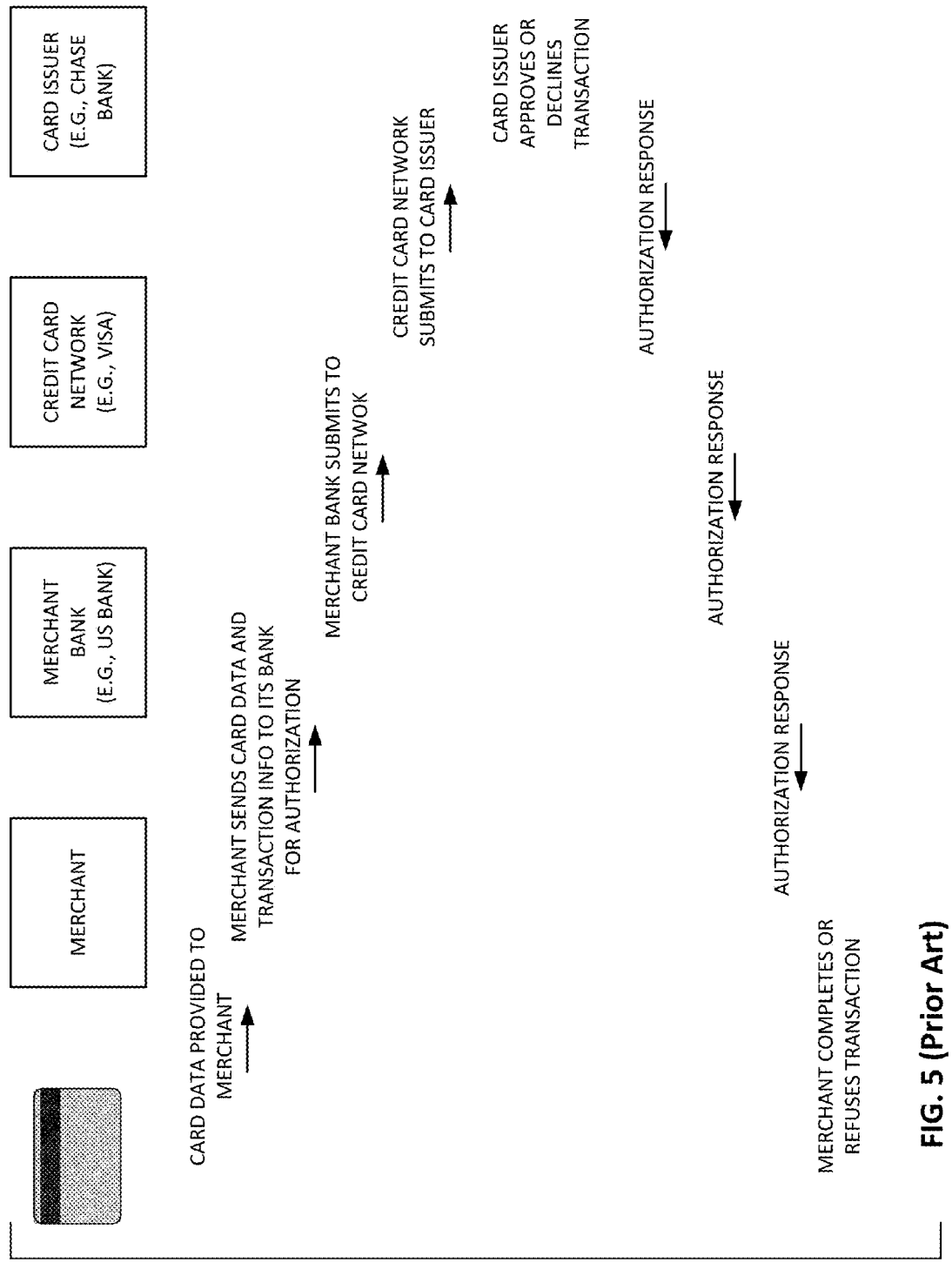
FIG. 5 illustrates a common type of credit card transaction processing.

The cooperating system decodes the account data and authentication data from the captured imagery. The transaction is next security-checked by use of the authentication data. Corresponding transaction information is then forwarded to the merchant's bank for processing. From this point on, the payment transaction may proceed in the conventional manner. (FIG. 5 illustrates a credit card approval process for a typical transaction.)

Figure 6:
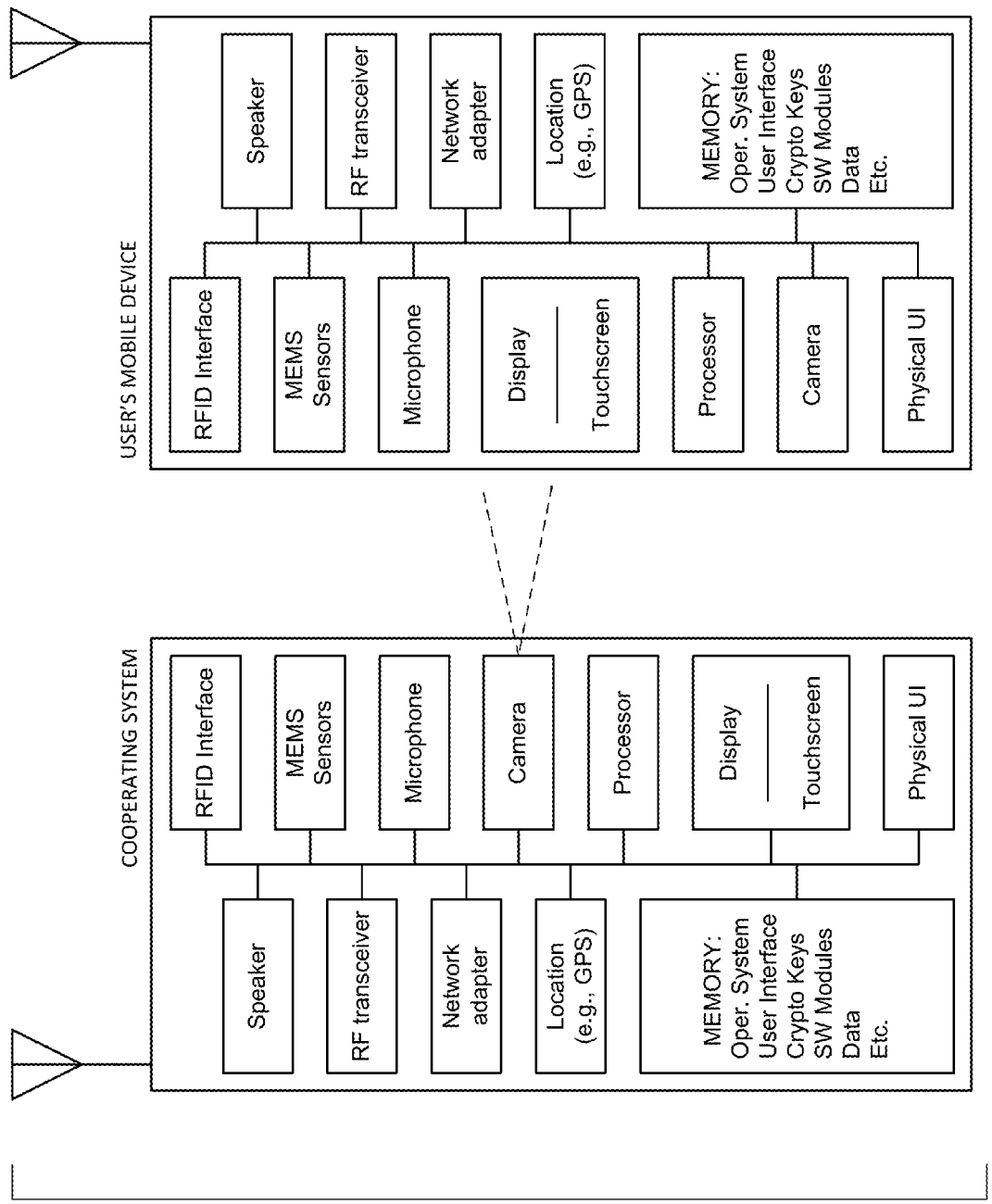
FIG. 6 shows a block diagram of a system in which a user's mobile device optically communicates with a cooperating system.

FIG. 6 shows some of the hardware elements involved in this embodiment, namely a user's smartphone, and a cooperating system. These elements are depicted as having identical components (which may be the case, e.g., if the cooperating system is another smartphone). The dashed lines illustrate that the camera of the cooperating system captures imagery from the display of the user smartphone.

Figure 7:
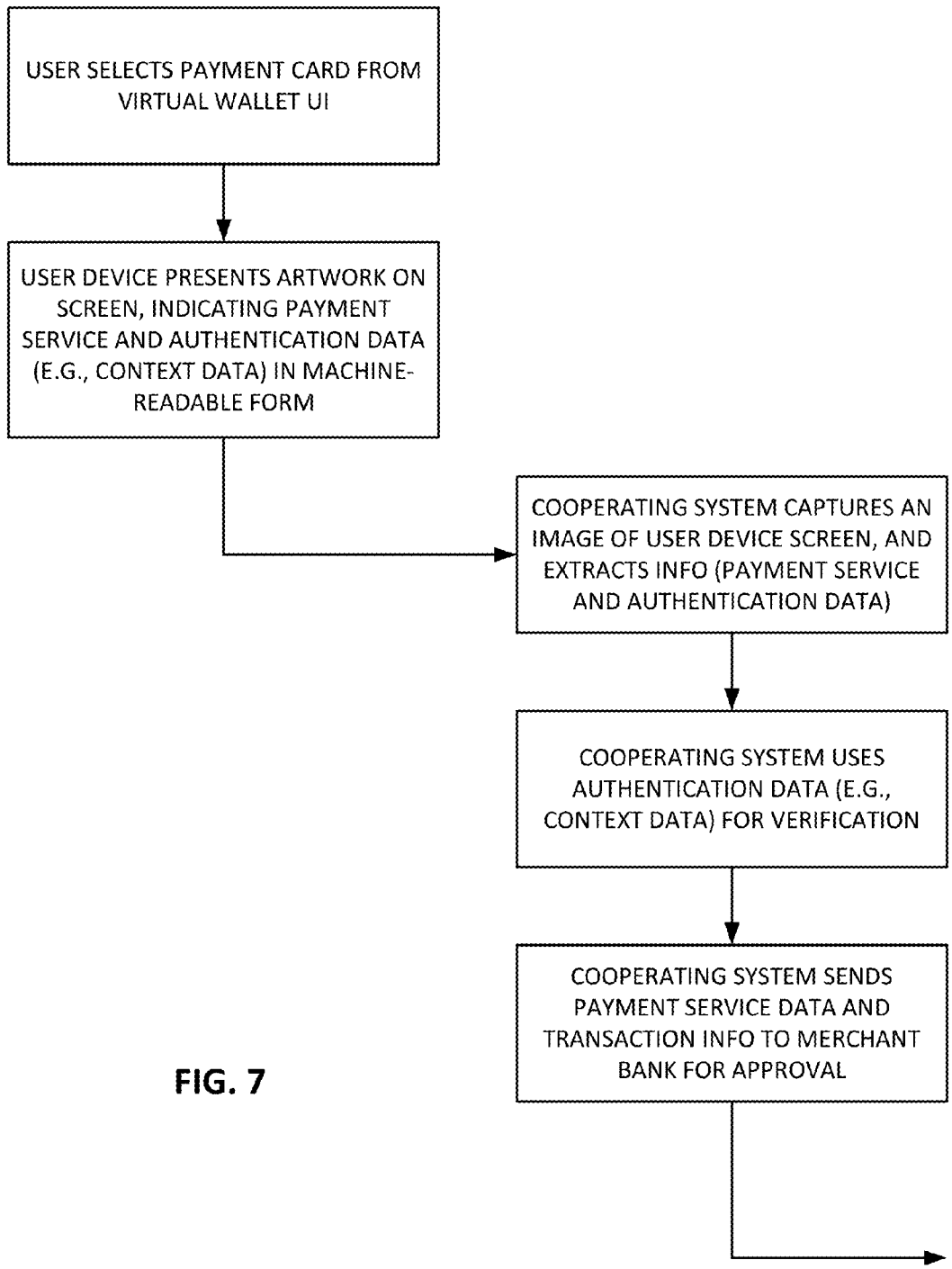
FIG. 7 is a flow chart detailing acts of an illustrative method.

FIG. 7 summarizes a few aspects of the above-described embodiment in flow chart form.

The authentication data used in the detailed embodiment can be of various types, and can serve various roles, as detailed in the following discussion.

A security vulnerability of many systems is the so-called "replay attack." In this scenario, a perpetrator collects data from a valid transaction, and later re-uses it to fraudulently make a second transaction. In the present case, if a perpetrator obtained imagery captured by a POS terminal, e.g., depicting the FIG. 4A virtual payment card of a user, then this same imagery might later be employed to mimic presentation of a valid payment card for any number of further transactions. (A simple case would be the perpetrator printing a captured image of the FIG. 4A screen display, and presenting the printed picture to a camera at a self-service checkout terminal to "pay" for merchandise.)

The authentication data of the present system defeats this type of attack. The authentication data is of a character that naturally changes from transaction to transaction. A simple example is time or data. If this information is encoded in the image, the cooperating system can check that the decoded information matches its own assessment of the time/date.

As sensors have proliferated in smartphones, a great variety of other authentication data can be employed. For example, some smartphones now include barometric pressure sensors. The barometric pressure currently sensed by the smartphone sensor can be among the data provided from the smartphone display to the cooperating system. The cooperating system can check a barometric sensor of its own, and confirm that the received information matches within some margin of error, e.g., 1 millibar. Temperature is another atmospheric parameter than can be used in this fashion.

Other authentication data concern the pose and/or motion of the smartphone. Smartphones are now conventionally equipped with a tri-axis magnetometer (compass), a tri-axis accelerometer and/or a tri-axis gyroscope. Data from these sensors allow the smartphone to characterize its position and motion, which information can be encoded in the displayed artwork. The cooperating system can analyze its captured imagery of the smartphone to make its own assessment of these data.

For example, in a supermarket context, a POS terminal may analyze camera data to determine that the shopper's camera is moving 1 foot per second (i.e., on a moving conveyor), and is in a pose with its screen facing straight up, with its top orientated towards a compass direction of 322 degrees. If the authentication data decoded from the artwork displayed on the camera screen does not match this pose/motion data observed by the POS terminal, then something is awry and the transaction is refused.

Another form of authentication data is information derived from the audio environment. A sample of ambient audio can be sensed by the smartphone microphone and processed, e.g., to classify it by type, or to decode an ambient digital watermark, or to generate an audio fingerprint. An exemplary audio fingerprint may be generated by sensing the audio over a one second interval and determining the audio power in nine linear or logarithmic bands spanning 300-3000 Hz (e.g., 300-387 Hz, 387-500 Hz, 500-646 Hz, 646-835 Hz, 835-1078 Hz, 1078-1392 Hz, 1392-1798 Hz, 1798-2323 Hz, and 2323-3000 Hz). An eight bit fingerprint is derived from this series of data. The first bit is a "1" if the first band (300-387 Hz) has more energy than the band next-above (387-500 Hz); else the first bit is a "0." And so forth up through the eighth bit (which is a "1" if the eighth band (1798-2323 Hz) has more energy than the band next-above (2323-3000 Hz).

The POS terminal can similarly sample the audio environment, and compute its own fingerprint information. This information is then compared with that communicated from the user's smartphone, and checked for correspondence. (The POS terminal can repeatedly compute an audio fingerprint for successive one second sample intervals, and check the received data against the last several computed fingerprints for a match within an error threshold, such as a Euclidean distance.)

In some implementations, the POS terminal may emit a short burst of tones—simultaneously or sequentially. The smartphone microphone senses these tones, and communicates corresponding information back to the POS terminal, where a match assessment is made. (In the case of a sequence of tones, a sequence of audio fingerprints may be communicated back.) By such arrangement, the POS terminal can influence or dictate, e.g., a fingerprint value that should reported back from the smartphone.

This is a form of challenge-response authentication. The POS terminal issues a challenge (e.g., a particular combination or sequence of tones), and the smartphone must respond with a response that varies in accordance with the challenge. The response from the smartphone is checked against that expected by the POS terminal.

Relatedly, information from the visual environment can be used as the basis for authentication data. For example, the smartphone may be held to face towards the camera of a POS terminal. A collection of colored LEDs may be positioned next to the camera of the POS terminal, and may be controlled by the POS processor to shine colored light towards the smartphone. In one transaction the POS system may illuminate a blue LED. In a next transaction it may illuminate an orange LED. The smartphone senses the color illumination from its camera (i.e., the smartphone camera on the front of the device, adjacent the display screen), and encodes this information in the artwork displayed on the phone screen. The POS terminal checks the color information reported from the smartphone (via the encoded artwork) with information about the color of LED illuminated for the transaction, to check for correspondence.

Naturally, more complex arrangements can be used, including some in which different LEDs are activated in a sequence to emit a series of colors that varies over time. This time-varying information can be reported back via the displayed artwork—either over time (e.g., the artwork displayed by the smartphone changes (steganographically)) in response to each change in LED color), or the smartphone can process the sequence of different colors into a single datum. For example, the POS terminal may be capable of emitting ten different colors of light, and it issues a sequence of three of these colors—each for 100 milliseconds, in a repeating pattern. The smartphone senses the sequence, and then reports back a three digit decimal number—each digit representing one of the colors. The POS checks the received number to confirm that the three digits correspond to the three colors of illumination being presented, and that they were sensed in the correct order.

In like fashion, other time-varying authentication data can be similarly sensed by the smartphone and reported back to the cooperating system as authentication data.

All of the above types of authentication data are regarded as context data—providing information reporting context as sensed by the smartphone.

Combinations of the above-described types of authentication data—as well as others—can be used.

It will be understood that use of authentication data as described above allows the risk of a replay attack to be engineered down to virtually zero.

Not only does the authentication data serve to defeat replay attacks, it can also be used to secure the payment card information against eavesdropping (e.g., a form of "man-in-the-middle" attack). Consider a perpetrator in a grocery checkout who uses a smartphone to capture an image of a smartphone of a person ahead in line, when the latter smartphone is presenting the FIG. 4B display that includes a barcode with payment card information. The perpetrator may later hack the barcode to extract the payment card information, and use that payment card data to make fraudulent charges.

To defeat such threat, the information encoded in the displayed artwork desirably is encrypted using a key. This key can be based on the authentication data. The smartphone presenting the information can derive the key from its sensed context data (e.g., audio, imagery, pose, motion, environment, etc.), yielding a context-dependent session key. The cooperating POS system makes a parallel assessment based on its sensed context data, from which it derives a matching session key. The authentication data thus is used to create a (context-dependent) secure private channel through which information is conveyed between the smartphone and the POS system.

There are many forms of encryption that can be employed. A simple one is an exclusive-OR operation, by which bits of the message are XOR-d with bits of the key. The resulting encrypted data string is encoded in the artwork presented on the smartphone screen. The POS system recovers this encrypted data from captured imagery of the phone, and applies the same key, in the same XOR operation, to recover the bits of the original message.

More sophisticated implementations employ encryption algorithms such as DES, SHA 1, MD5, etc.

Additional security can be provided by use of digital signature technology, which may be used by the POS system to provide for authentication (and non-repudiation) of the information received from the smartphone (and vice-versa, if desired).

In one such embodiment, information identifying the phone or user is conveyed from the phone to the POS system (e.g., via the encoded artwork displayed on the phone screen). This identifier can take various forms. One is the phone's IMEI (International Mobile Station Equipment Identity) data—an identifier that uniquely identifies a phone. (The IMEI can be displayed on most phones by entering *#06# on the keypad.) Another is a phone's IMSI (International Mobile Subscriber Identity) data, which identifies the phone's SIM card. Still other identifiers can be derived using known device fingerprinting techniques—based on parameter data collected from the phone, which in the aggregate distinguishes that phone from others. (All such arrangements may be regarded as a hardware ID.)

This identifier can be conveyed from the phone to the POS system in encrypted form, e.g., using context-based authentication data as described above.

Upon receipt of the identifier, the POS system consults a registry (e.g., a certificate authority) to obtain a public key (of a public-private cryptographic key pair) associated with that identifier. This enables the phone to encrypt information it wishes to securely communicate to the POS system using the phone's (or user's) private key. (This key may be stored in the phone's memory.) Information that may be encrypted in this fashion includes the payment card data. The POS system uses the public key that it obtained from the certificate authority to decrypt this information. Because the communicated information is signed with a key that allows for its decryption using the public key obtained from the certificate authority, the information is known by the POS system to have originated from the identified phone/user. (The public/private key pairs may be issued by a bank or other party involved in the transaction processing. The same party, or another, may operate the certificate authority.) Once the POS system has determined the provenance of the information provided by the mobile phone, a secondary check can be made to determine if the card information provided is associated with the phone, creating a second layer of security for a would-be attacker to surmount (beyond registering a fraudulent phone within the system, they would also have to associate the copied card information for a replay attack with the fraudulent phone).

The context based authentication data can also be encrypted with the private key, and decoded with the corresponding public key obtained from the certificate authority. In this case, since context-based authentication data is encrypted with a key that is tied to the device (e.g., via an IMEI identifier through a certificate authority), then this authentication data is logically bound to both the context and the user device.

The use of physically unclonable functions (PUFs) can also be utilized to provide confidence that the observed optical event (imager of the cooperating device) has not been spoofed. These may include but are not limited to shot-noise and temporal noise of the camera, properties of the image processing pipeline (compression artifacts, tonal curves influenced by Auto White Balance or other operations), etc. In addition, properties of the display of the mobile device can be used for this same purpose, such as dead pixels or fluctuations of display brightness as a function of time or power.

(U.S. Pat. No. 7,370,190, which is hereby incorporated herein by reference in its entirety, provides additional information about physically unclonable functions, and their uses—technology with which the artisan is presumed to be familiar.)

It will be recognized that prior art transactions with conventional credit cards, based on magnetic stripe data, offer none of the security and authentication benefits noted above. The technologies described herein reduce costs and space requirements at checkout by eliminating need for mag stripe readers or RFID terminals. While "chip card" arrangements (sometimes termed "smart cards") offer a variety of digital security techniques, they require specialized interface technology to exchange data with the chip—interface technology that has no other use. The just-described implementations, in contrast, make use of camera sensors that are commonplace in smartphones and tablets, and that are being increasingly deployed by retailers to read barcodes during checkout. This means that the marginal cost of reading is software only, in that hardware reader requirements are consistent with industry trends towards image capture at retail checkout, thereby exploiting a resource available at no marginal cost to implementers of the present technology. Notably, the reader function could be implemented in hardware as well, if doing so would provide superior cost effectiveness. The same imager-based readers could read other indicia, such as QR codes, authenticate digitally-watermarked driver licenses, and OCR relevant text.

Similarly, the system is more economical than all magnetic stripe and RFID systems because no physical cards or chips are required. (This is a particular savings when contrasted with chip card systems, due to the microprocessors and gold-plated interfaces typically used in such cards.) Nor is there any cost associated with distributing cards, confirming their safe receipt, and attending to their activation. Instead, credentials are distributed by electronically sending a file of data corresponding to a wallet card—encrypted and digitally signed by the issuing bank—to the phone, and using that file data to add the card to the smartphone wallet. The installation and activation of the card can be tied to various unique aspects of the device and/or user characteristics, such as, for example, a hardware ID or a hash of user history or personal characteristics data.

A still further advantage is that the present technology is helpful in alleviating piriformis syndrome. This syndrome involves inflammation of the sciatic nerve due to pressure in the gluteal/pelvic region. A common cause of such pressure is presence of a large wallet in a person's rear pocket, which displaces customary pelvic alignment when sitting. By removing physical cards from a user's wallet, the wallet's volume is reduced, reducing attendant compression of the sciatic nerve. Elimination of the wallet requirement also improves security and convenience of payment processing for users.

Presentation of Multiple Cards

The arrangements just-described involved presentation of a single card—a payment card. Sometimes plural cards are useful. One example is where a merchant offers discounts on certain items to users who are enrolled in the merchant's loyalty program. Another is where an airline offers a discount on checked luggage fees to fliers who are members of its frequent flier program In accordance with a further aspect of the technology, the UI on payment module of the user's smartphone permits selection of two or more cards from the virtual wallet. One is a payment card, and the other may be a loyalty ("merchant") card. Data corresponding to both cards may be optically conveyed to the cooperating system via the artwork presented on the display of the user's smartphone.

Figure 8:
FIGS. 8 and 9 show screenshots of a user interface for selecting and presenting two cards to a vendor.
Figure 9:
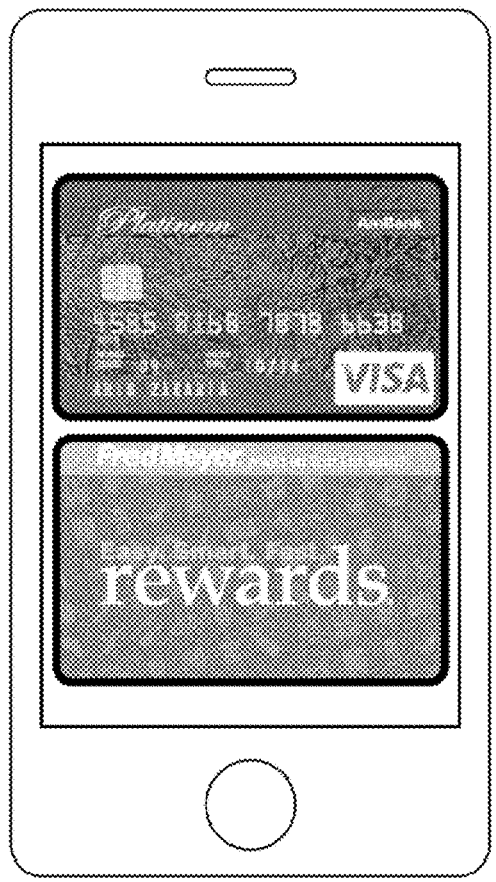

FIG. 8 shows one such user interface. As before, the user flips through the deck of virtual wallet cards to find a first desired card. Instead of the user tapping the card for selection, a sweeping gesture is used to move the virtual card above the deck (as shown by the Visa card in FIG. 8), while the rest of the virtual deck slides down to make room. The user then continues flipping through the deck to locate a second card, which is selected by tapping. As a consequence of these actions, the phone screen presents artwork representing both the selected payment card, and the other (merchant) card, as shown in FIG. 9.

As before, information encoded in the displayed artwork is sensed by a camera of a cooperating system, and is used in connection with a transaction. The payment card information may be encoded in the portion of the artwork corresponding to the payment card, and likewise with the merchant card information. Or information for both cards can be encoded throughout the displayed imagery (as can the authentication information).

Figure 10A:
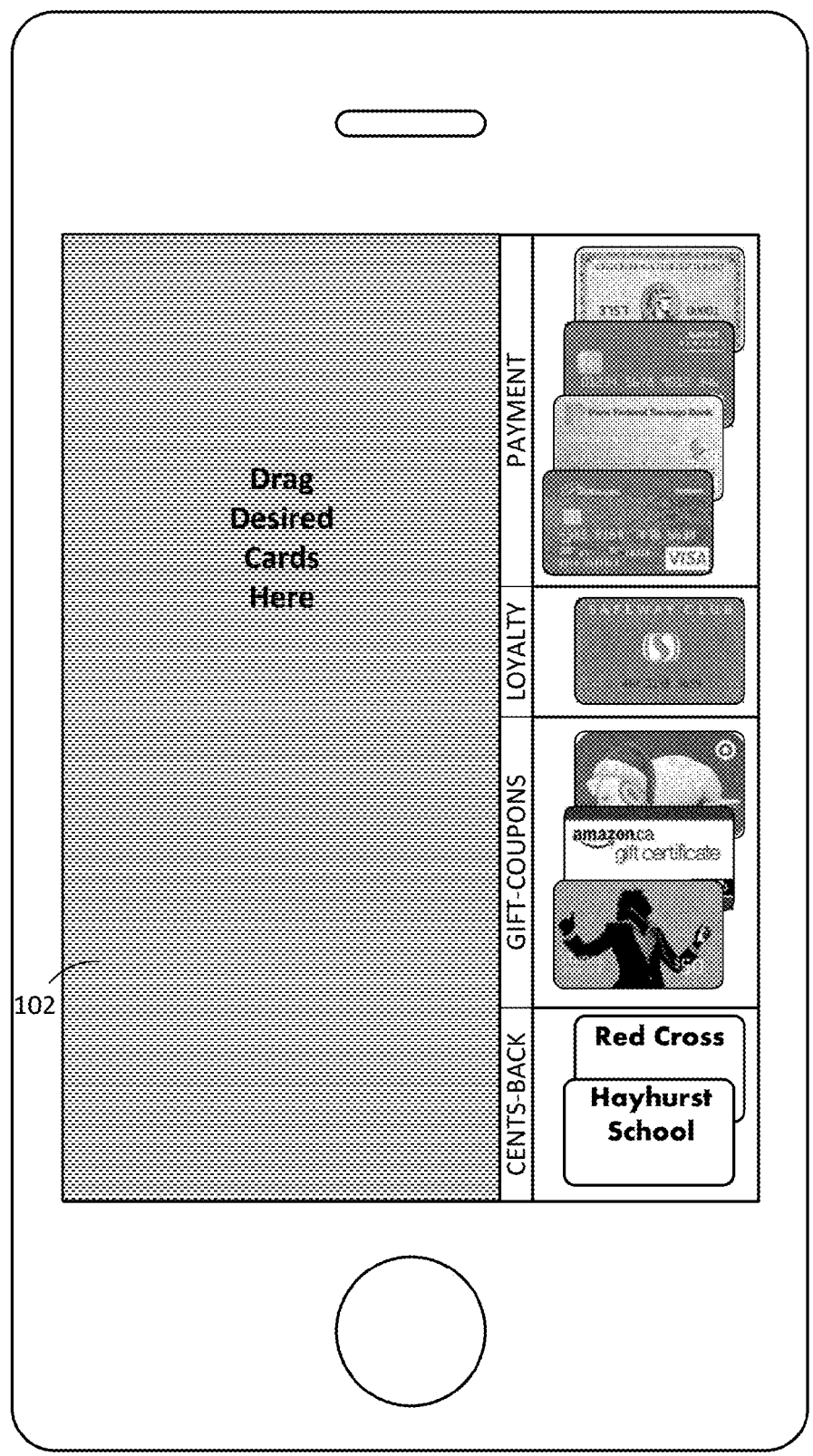
FIGS. 10A and 10B show screenshots of an alternative user interface for selecting and presenting multiple cards to a vendor.

FIG. 10A shows another style of user interface permitting selection of multiple wallet cards. Here, thumbnails of different cards are organized by type along the right edge: payment cards, loyalty cards, gift and coupon cards, and cents-back cards. (Cents-back cards serve to round-up a transaction amount to a next increment (e.g., the next dollar), with the excess funds contributed to a charity.) This right area of the depicted UI is scrollable, to reveal any thumbnails that can't be presented in the available screen space.

Desirably, the thumbnails presented on the right side of the UI are ordered so that the card(s) that are most likely to be used in a given context are the most conspicuous (e.g., not partially occluded by other cards). For example, in a Safeway store (as determined by GPS data, cross-referenced against map data identifying what businesses are at what locations; or as indicated by a sensed audio signal—such as detailed in Shopkick's patent application 20110029370, which is hereby incorporated herein by reference in its entirety), the Safeway loyalty card would be most readily available. Similarly, if a shopper historically tends to use a Visa card at the Safeway store (perhaps because the issuing bank issues triple miles for dollars spent at grocery stores), then the Visa card thumbnail would be positioned at a preferred location relative to the other payment card options. Forward chaining of inference can be used to predict which cards are most likely to be used in different situations.

Figure 10B:
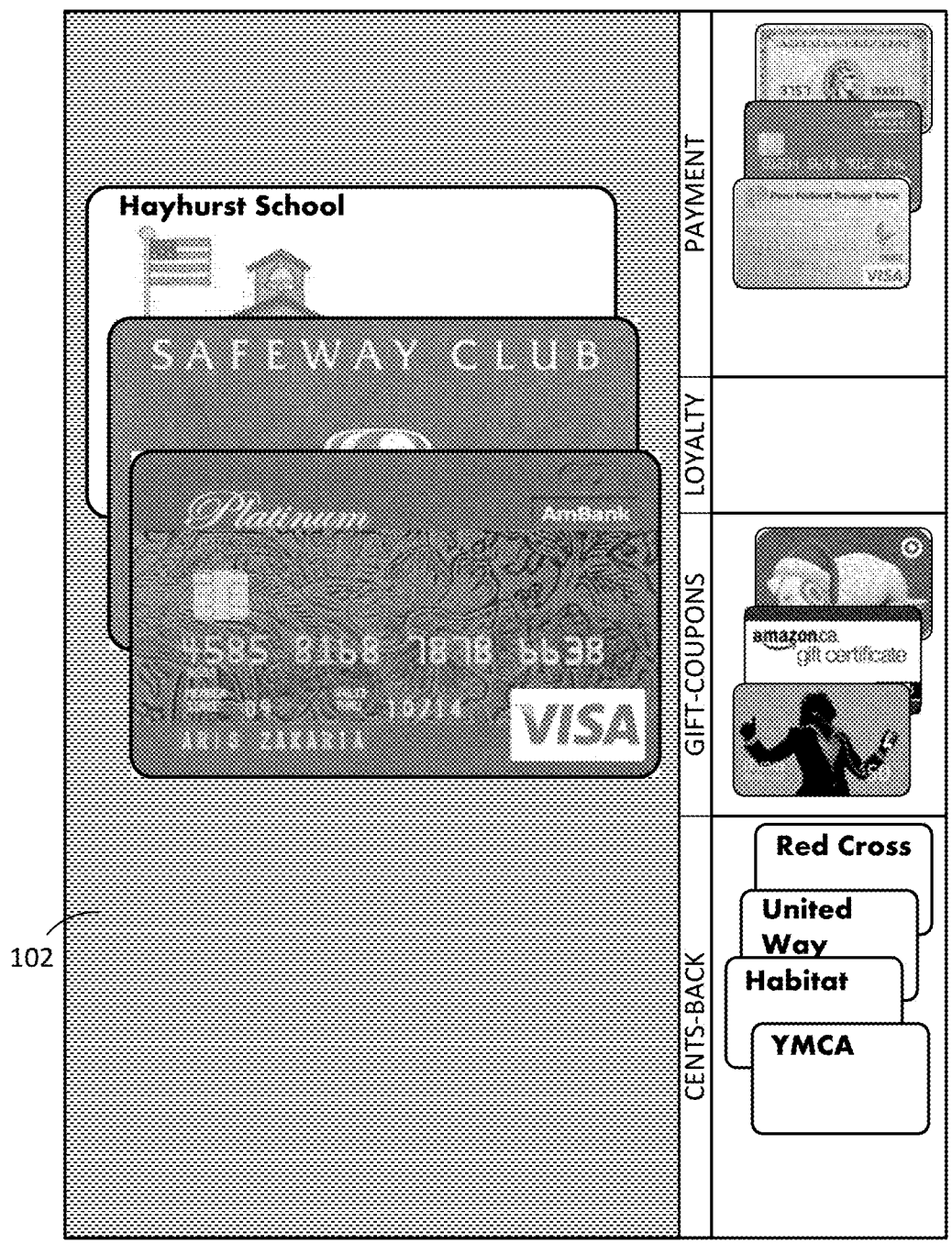

To use this form of interface, the user slides thumbnails of selected cards towards the center of the screen where they expand and stack, as shown in FIG. 10B. The user may assemble a recipe of cards including a credit card, a pair of coupon cards, a gift card, a loyalty card, and a cents-back card, while the grocery clerk is scanning items. Once the desired deck of cards is assembled, the deck is single-tapped (or in another embodiment double-tapped) to indicate that the user's selection is completed. The displayed artwork is again encoded with information, as described earlier, for optical reading by a cooperating system. As shown in FIGS. 10A and 10B, the artwork can include a background pattern 102, and this background pattern can also be encoded (thereby expanding the payload size and/or increasing the encoding robustness).

A visual indicia can be presented on the screen indicating that the artwork has been steganographically-encoded, and is ready to present for payment. For example, after the user has tapped the stack, and the artwork has been encoded, dark or other distinctive borders can appear around the card depictions.

A user interface can also be employed to split charges between two payment cards. Both cards may be in the name of the same person, or cards from two persons may be used to split a charge. (One such example is a family in which a weekly allowance is issued to teens by deposits to a prepaid debit card. A parent may have such a debit card for a teen in their smartphone wallet, and may occasionally agree to split the costs of a purchase with the teen.)

Figure 10C:
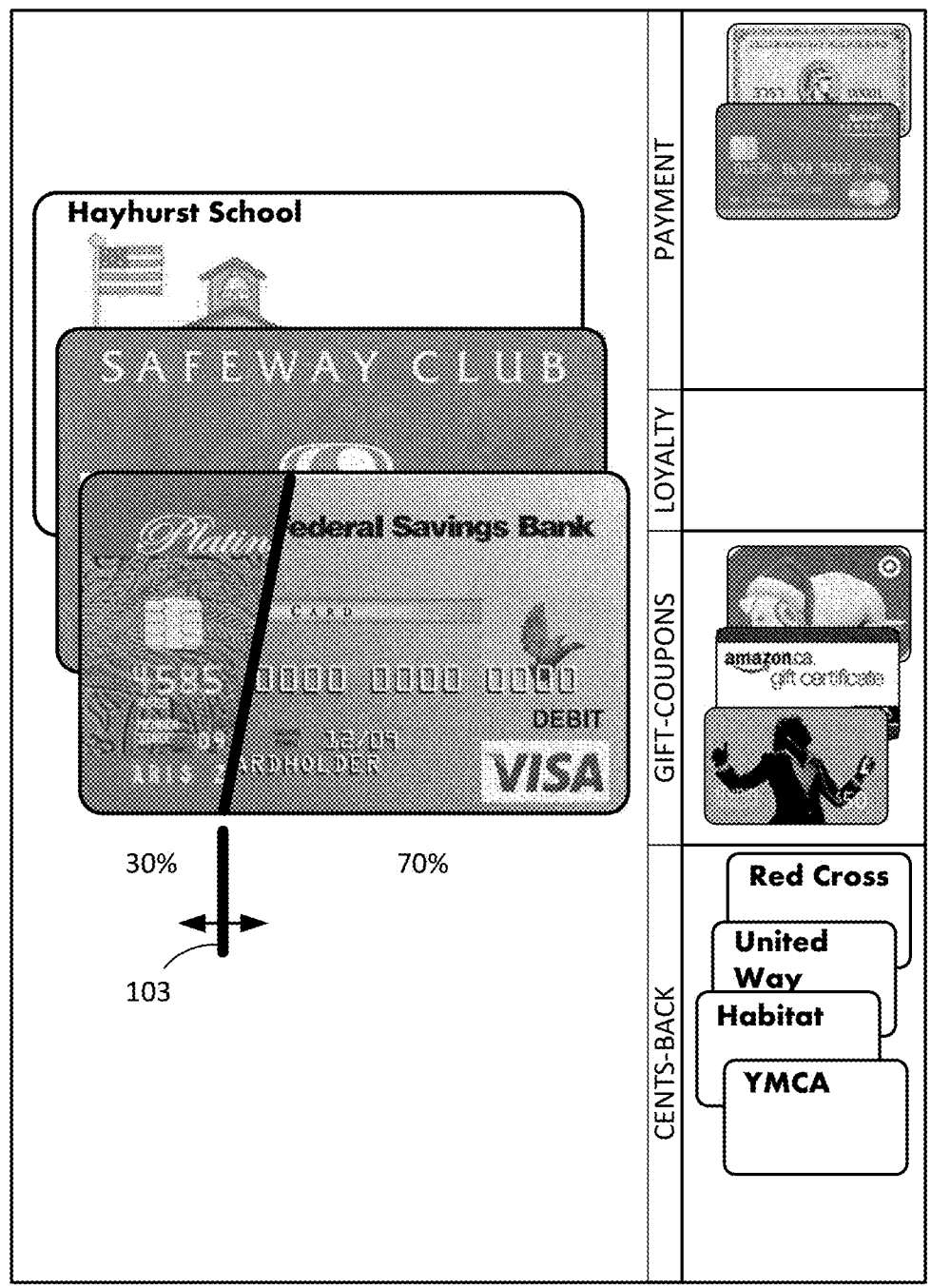
FIG. 10C illustrates how a payment can be split between two payment cards, in accordance with one aspect of the present technology.

As shown in FIG. 10C, the artwork presented in one such UI case includes a hybrid card—a graphic composed partly of artwork associated with one card, and partly of artwork associated with another card. At the junction of the two parts is a dark border, and a user interface feature 103 that can be touched by the user on the touch screen and slid right or left to apportion a charge between the two cards in a desired manner. The illustrated UI shows the split detailed in percentage (30%/70%), but a split detailed in dollars could alternatively, or additionally, be displayed.

Auctioning Transaction Privileges:

Consider a shopper who populates a shopping cart—either physical or virtual. The cart's total is determined and presented via a device user interface (UI). Stored in device memory is an electronic payment module (or "virtual wallet") comprising software instructions and/or libraries that cause the device to present the user interface (UI) on the display.

This particular user has many different payment options associated with her virtual wallet, e.g., various credit accounts, credit cards, BitCoin credit, store cards or rewards, PayPal account(s), checking and/or savings account(s), etc. The virtual wallet may also include, e.g., frequent flyer account information, reward program information, membership information, loyalty membership information, coupons, discount codes, rebates, etc.

The user may indicate through the UI that she is ready to check out and purchase the cart items. If the UI cooperates with a touchscreen interface the user may indicate by touching the screen, flipping through various screens, scrolling, checking boxes, selecting icons, etc. In response, an auction is launched to determine which financial vendor associated with her virtual wallet will facilitate the financial transaction. In other cases, a solicitation of offers is launched to gather offers from the financial vendors associated with her virtual wallet. The virtual wallet can launch the solicitation or auction in a number of ways.

For example, the virtual wallet can communicate with the various financial vendors associated with the user's different payment options. Cart total and contents, store and user location(s), user credit history, etc. can be forwarded to the different financial institutions to consider as they bid to facilitate the user's transaction. If the cart's total is $97.23, American Express may, for example, decide to offer a discount to the user if she uses her American Express account. With the discount the transaction total may now only cost the user, e.g., $92.37. American Express may decide to offer the discount in exchange for promotional or marketing opportunities, pushing targeted advertisements or providing other opportunities to the user during or after the transaction. Or American Express may have a discount arrangement with the store from which the user is shopping, e.g., Target or Amazon.com, and/or a discount arrangement for certain of the cart items. A portion of the discount can be passed along to the user. American Express may base a decision to bid—and the amount of any discount associated with such bid—on a number of factors, e.g., the user's credit history with their American Express account, their overall credit history, a length of time since the user used the account, the user's past response to targeted advertising, agreements with retailers or distributors, the user's demographics, promotion or marketing opportunities to the user, etc.

During the auction another creditor, e.g., PayPal's BillMeLater, may decide based on the user's credit history that she is a solid risk. So BillMeLater low-balls the bid, offering a bargain-basement cost of $82.19 for the purchase, but BillMeLater couples their bid with the user's required acceptance to establish or increase a line of credit.

Another creditor may promise a discount+a certain number of reward or mileage points if the user makes selects them for the transaction. Still another may bid/offer an extended warranty if purchased with them.

The auction can be time-limited so bids must be submitted within a certain response time. In other cases, the user can be preapproved for certain deals or promotions based on her location, which will help reduce auctions time. For example, the virtual wallet may determine that the phone is currently located in Wal-Mart or Target. Location information can be determined from user input, e.g., entering into the virtual wallet—or selecting from a screen pull-down or flip through—that the user is currently shopping in Wal-Mart, GPS information (e.g., coupled with a search of GPS coordinates), environmental information sensed by the user device upon entering the store (e.g., image recognition from recent camera pictures, analyzing digitally watermarked audio playing in a store, calculating audio fingerprints of ambient audio, audio beacons like Apple's iBeacons, Wi-Fi information network, etc.), etc. The virtual wallet can start to solicit bids from financial vendors associated with the virtual wallet or user as soon as the virtual wallet determines that the user is in a retail establishment, even though the user has not finished populating their cart and are not located at checkout. Incoming bids may then be based on all or some of the above factors, e.g., credit history, promotion opportunities, available discounts, etc., and less on the actual cart contents.

The virtual wallet can also start an auction or solicit offers when the first (or other) item is added to the cart.

The virtual wallet can also receive pre-authorization or firm bids from financial vendors. For example, Bank of America may decide that they are offering to the user a 3% discount for all in-store purchases at Wal-Mart made during the upcoming weekend. The virtual wallet stores this information and can present the offer if and when the user finds herself in Wal-Mart. The pre-authorization may include or link to promotional opportunities to be displayed during or after purchase.

The user can select from the various bids to determine which financial vendor will facilitate her transaction. For example, a double tap on a graphic with the desired bid can initiate the transaction. The user can be prompted to confirm the transaction if desired.

The virtual wallet can be user-configured to present only those bids meeting certain criteria. For example, through a settings screen or user interface, the user may decide that she only wants to see and consider the top 2 or 3 bids with cash-only discounts; such a setting will result in the user interface only presenting such top bids. Or the user may be interested in mileage rewards, or credit opportunities; and these will be presented in the top bids. Or the user can decide NOT to be bothered with the decision and may select a "best-deal" mode where the virtual wallet selects a bid based on a plurality of factors including, e.g., deepest discount, best long term financing, and/or proximity to reward levels (e.g., the user only need 5000 more mileage points to qualify for a trip to Hawaii). Such factors may be weighted according to user preference and a top bid can be determined as one with the highest overall weighting. (E.g., 10 points if the bid includes the deepest discount, 1 if it's the least discount; 8 points if the bid includes free long-term financing, 1 if it doesn't; 5 points if the bid includes reward points, 0 if it doesn't; 10 points if the user has selected this payment option recently, 1 if they haven't; 9 points if the user has a low balance on the credit account, 0 if they are near their credit limit; etc., and/or other weighting schemes.)

A virtual wallet may also be configured to track reward status. E.g., if a newly purchased TV is defective, and a user takes it back for a refund, a merchant may communicate with a virtual wallet (or a financial vendor represented in the virtual wallet) to issue a credit. The refund may result in reward points being pulled from a rewards account. This information may be reflected in the virtual wallet.

The virtual wallet may also communicate with a broker or intermediary service. The broker or intermediary service can aggregate information, vendor bids, pre-authorizations, promotions, advertising etc. and associate such with a user or user device. In operation, the virtual wallet communicates with the broker who communicates (and may generate themselves) various bids and promotion opportunities back to the virtual wallet.

Auctions associated with the virtual wallet are not limited to retail checkout locations. The virtual wallet can help find better deals on many other items and services.

For example, a user can prompt the virtual wallet that they need gas. This may cause the virtual wallet to launch a search, auction and/or solicitation for the best possible deals. The auction can consider the various cards and memberships that the user has in her wallet. For example, a user's wallet may include a Chevron rewards card and an American Express account. This information can be communicated to various financial vendors including Chevron and American Express (or their intermediaries). An incoming bid may be presented to the mobile device including additional gas points on the Chevron rewards card and/or a discount if the American Express card is used. If a local Chevron Station is running a promotion, such information can be communicated to the virtual wallet for presentation to the user as well.

In some cases, the virtual wallet can be configured to communicate some or all details about a bid to a competing financial vendor—making the auction even more transparent to participating vendors. A competing vendor may decide to alter their initial bid to sweeten the deal. For example, Shell may decide that they don't want to be outbid by Chevron, and they may send the virtual wallet a bid that is lower, includes more rewards, or otherwise try to seduce the user. Shell's response can be sent back to Chevron, or Chevron's intermediary, who may decide to sweeten their bid in response.

In some cases, the auction can be geographically constricted, e.g., only gas stations within a pre-determined number of miles from a user are considered for an auction. The virtual wallet can determine which stations meet this location criteria by cooperation with one of the many available software apps that determine such stations based on a user's location (e.g., Google Maps, GasBuddy, etc.). Once a station is chosen, the virtual wallet may launch mapping software on the mobile device, pass into the mapping software a winning station's address or GPS coordinates, so that the user can have step-by-step driving directions to the station. Alternatively, the destination address, or the turn by turn instructions, can simply be passed to the control system of a self-driving vehicle, which can drive itself to the gas station, and complete the transaction.

Instead of a user prompting the virtual wallet that she needs gas, the virtual wallet may initiate an auction or solicitation based on other factors. For example, GPS coordinates may indicate that the user is located at or approaching a gas station. An auction may be launched based on such proximity information.

In many cases, cars are becoming smarter and smarter. Cars are already available with low fuel warnings, low tire pressure warnings, service engine warnings, etc. Such warnings may be communicated to the user's device (e.g., via a Bluetooth pairing between the car and mobile phone) and used by the virtual wallet to initiate an auction to provide the best deals to address the warning.

Of course, the virtual wallet need not completely reside on a user's smartphone. For example, components of such may be distributed to the cloud, or to other available devices for processing. In the above example, a virtual wallet may handoff direction to a car's onboard computer and let it do some or all of the direction. In other cases, a wallet shell resides on the cell phone. In this embodiment, the shell includes, e.g., graphic drivers and user interfaces to allow device display, user input and communication with a remote location. Storage of credit card information and other wallet contents are stored remotely, e.g., in the cloud.

A virtual wallet may cause a digital watermark detector (or fingerprint generator) to analyze background audio in a background collection mode. For example, once operating in this background mode a detector or generator may analyze audio accompanying radio, internet, TV, movies, all to decode watermarks (or calculates fingerprints) without requiring human invention. The audio may include watermarks (or result in fingerprints) that link to information associated with advertising, store promotional, coupons, etc. This information can be stored in the virtual wallet, e.g., according to store identifier, location, event, etc. Later, when the virtual wallet enters a store (or comes in proximity of a remote checkout terminal, e.g., a computer), the virtual wallet can receive location or retail information, e.g., included in a signal emanating from an iBeacon or audio source. The virtual wallet may use retail information to search through its stored, previously encountered audio. The virtual wallet can prompt the user if discounts, coupons, promotions are found, or may apply any such discounts/coupons at checkout.

Message Payloads

Some embodiments benefit from using a relatively large payload (e.g., 500-2,500 bits) during a virtual wallet transaction. The payload can be carried in a digital watermark that is embedded in displayed imagery or video, encoded in hearing range audio, or transmitted using a high frequency audio channel. The payload may correspond with credit card or financial information (e.g., ISO/IEC 7813 information like track 1 and track 2 information), account information, loyalty information, etc. Payload information may be stored or generated locally on a smartphone, or the smartphone may query a remotely-located repository to obtain such. In some cases the remotely located repository provides a 1-time token which can be used for a single (sometimes application specific) transaction. In such cases, the receiving party can transmit the 1-time token to a $3^{rd}$ party clearing house (which may or may not be the remotely located repository) to facilitate payment using the 1-time token. The 1-time token can be cryptographically associated with a user account or user payment.

Now consider encoded, displayed imagery. A user presents their portable device to a point of sale station which includes an optical reader or digital camera. In some cases the point of sale station is a portable device, e.g., like a smartphone, pad or tablet. The user's portable device displays digital watermarked imagery on the device's display for capture by the station's reader or camera. The displayed imagery can be a still image, e.g., an image or graphic representing a credit card, a picture of the family dog, an animation, etc. A virtual wallet can be configured to control the display of the image or graphic so that multiple frames (or versions) of the same still image or graphic are cycled on the display. Preferably, the displayed images appear as if they are collectively a static image, and not a video-like rendering. Each instance of the displayed image or graphic (or groups of images) carries a payload component. For example, a first displayed image carries a first payload component, a second displayed image carries a second payload component . . . and the nth-displayed image carries an nth-payload component (where n is an integer). Since the only change to each displayed image is a different payload component, which is generally hidden from human observation with digital watermarking, the displayed images appear static—as if they are collectively a single image—to a human observer of the smartphone display. A decoder, however, can be configured to analyze each separate image to decode the payload component located therein.

The payload components can take various forms. In a first embodiment, a relatively large payload is segmented or divided into various portions. The portions themselves can be used as the various components, or they can be processed for greater robustness, e.g., error correction encoded, and then used as the various payload components. For example, once the whole payload is segmented, a first portion is provided as the first payload component, which is embedded with digital watermarking in the first image for display, a second portion is provided as the second payload component, which is embedded with digital watermarking in a second image for display, and so on. Preferably, each of the various payload portions includes, is appended to include, or is otherwise associated or supplemented with a relative payload position or portion identifier. This will help identify the particular payload portion when reassembling the whole payload upon detection.

A watermark detector receives image data depicting a display (e.g., smartphone display) captured overtime. Capture of imagery can be synchronized with cycled, displayed images. The watermark detector analyzes captured images or video frames to detect digital watermarks hidden therein. A hidden digital watermark includes a payload component.

In the above first embodiment, the payload component corresponds to a payload portion and carries or is accompanied by a portion identifier (e.g., 1 of 12, or 3 of 12, etc.). The watermark detector, or a processor associated with such detector, combines decoded payload components and attempts to reconstruct the whole payload. For example, the payload portions may need to simply be concatenated to yield the entire payload. Or, once concatenated, the payload may need to be decrypted or decoded. The detector or processor tracks the portion identifiers, and may prompt ongoing detection until all payload portions are successfully recovered. If the detector misses a payload component (e.g., 3 of 12), it preferably waits until that component is cycled back through the display and successful captured and decoded, or may direct communication with the display that it needs, e.g., payload component 3 of 12.

From a display side, if the whole payload is carried by 12 payload components, corresponding to 12 embedded image versions (each individual image version carrying one of the 12 payload components), then the 12 image versions can be repeatedly cycled through the display, e.g., for a predetermined time (e.g., 3-30 seconds) or until stopped by the user or point of sale station communicating a successful read back to the virtual wallet. If the display has a frame rate of 24 frames per second, then the 12 embedded image versions can be collectively cycled twice per second (or more or less depending on display frame rates).

In another embodiment of carrying a relatively large payload in displayed imagery, we present embodiments using signal coding techniques known as erasure codes and/or rateless codes. One example of these codes is the so-called "fountain codes." For example, see, e.g., MacKay, "Fountain codes," IEE Proc Commun 152(6):1062-1068, December 2005, which is hereby incorporated herein by reference in its entirety. See also U.S. Pat. No. 7,721,184, which is hereby incorporated herein by reference in its entirety.

To quote MacKay, from the above referenced paper, "Abstract: Fountain codes are record-breaking sparse-graph codes for channels with erasures, such as the internet, where files are transmitted in multiple small packets, each of which is either received without error or not received. Standard file transfer protocols simply chop a file up into K packet sized pieces, then repeatedly transmit each packet until it is successfully received. A back channel is required for the transmitter to find out which packets need retransmitting. In contrast, fountain codes make packets that are random functions of the whole file. The transmitter sprays packets at the receiver without any knowledge of which packets are received. Once the receiver has received any N packets, where N is just slightly greater than the original file size K, the whole file can be recovered. In the paper random linear fountain codes, LT codes, and raptor codes are reviewed. . . . 2. Fountain Codes. The computational costs of the best fountain codes are astonishingly small, scaling linearly with the file size. The encoder of a fountain code is a metaphorical fountain that produces an endless supply of water drops (encoded packets); let us say the original source file has a size of K1 bits, and each drop contains 1 encoded bits. Now, anyone who wishes to receive the encoded file holds a bucket under the fountain and collects drops until the number of drops in the bucket is a little larger than K. They can then recover the original file. Fountain codes are rateless in the sense that the number of encoded packets that can be generated from the source message is potentially limitless; and the number of encoded packets generated can be determined on the fly. Fountain codes are universal because they are simultaneously near optimal for every erasure channel. Regardless of the statistics of the erasure events on the channel, we can send as many encoded packets as are needed in order for the decoder to recover the source data. The source data can be decoded from any set of K0 encoded packets, for K0 slightly larger than K. Fountain codes can also have fantastically small encoding and decoding complexities."

One advantage of a fountain code is that a detector need not communicate anything back to a transmitter about which payload portions, if any, are missing. For example, fountain codes can transform a payload into an effectively large number of encoded data blobs (or components), such that the original payload can be reassemble given any subset of those data blobs, as long the same size, or a little more than the same size, of the original payload is recovered. This provides a "fountain" of encoded data; a receiver can reassemble the payload by catching enough "drops," regardless of which ones it gets and which ones it misses.

We can use erasure codes (e.g., fountain codes) to convey a relatively large payload for use with displayed imagery. For example, the relatively large payload can be presented to a fountain code encoder, which creates a plurality of encoded data blobs (e.g., encoded components). In some cases, each encoded data blob is accompanied with an index or seed. The index or seed allows the decoder to use a complementary decoding procedure to reconstruct the payload. For example, the encoder and decoder may agree on a pseudo-random number generator (or an indexed-based matrix generator). In one example, the generator includes an n×n random bit non-singular matrix where n is the payload's bit length. The matrix can be processed with a dot product of the payload which yields yn outputs. An index can be associated with each yn output, to allow reconstruction by the decoder. In another example, we can seed a generator with a randomly chosen index, and use that to pick a degree and set of source blocks. An encoded data blob is sent with the seed or index for that encoded block, and the decoder can use the same procedure to reconstruct the payload from received blobs/indexes.

Another example is considered with reference to FIG. 16. Payload 170 is presented to a Fountain Code Generator 171. Of course, other types of erasure code generators may be used instead, e.g., Raptor Codes or LT codes (Luby Transform codes). The payload 170 can be a relatively large payload (e.g., in comparison to other, smaller digital watermarking payloads). Payload 170 preferably includes, e.g., 500-8 k bits. (Raptor and LT codes may be helpful when using even larger payloads, e.g., greater than 8 k bits.) One specific example is a payload including 880 bits. Payload 170 may include or may be appended to include additional error correction bits, e.g., CRC bits. Additional CRC bits can be added to the 880 bit payload example, e.g., 32 additional bits.

Fountain Code Generator 171 produces a plurality of coded outputs (or data blobs), Y1 . . . YN, where N is an integer value. Data blob outputs are provided to a Digital Watermark Embedder 172. Digital Watermark Embedder 172 uses the data blob outputs as payloads to be respectively hidden in image versions (I1-IN). The term "image version" may correspond to a copy or buffered version of a static (or still) Image (I) 174 that the user (or virtual wallet) has selected to represent a financial account or credit card or the like. Instead of being a copy of a still image, an image version may correspond to a video frame or video segment. Digital Watermark Embedder 172 embeds a data blob (e.g., Y1) in an image version I1 and outputs such (resulting in watermarked image version Iw1) for display by Display 173. Digital Watermark Embedder 172 continues to embed data blobs in image version, e.g., Y2 in I2 and output (Iw2) for display, Y3 in I3 and output (Iw3) for display and so on. Parallel processing may be advantageously used to embed multiple image versions in parallel. In alternative arrangements, Digital Watermark Embedder 172 delegates embedding functions to other units. For example, Display 173 may include or cooperate with a GPU (graphics processing unit). Digital Watermark Embedder 172 may determine watermark tweaks (or changes) corresponding to embedding an output data blob in an image version and pass that information onto the GPU, which introduces the changes in an image version. In other case Digital Watermark Embedder 172 may calculate a watermark title (e.g., a watermark signal representing an output data blob) can convey such to another unit like the GPU. The GPU may then consider other factors like a perceptual embedding map or human attention model and introduce the watermark title in an image version with consideration of the map or model. (In FIG. 16, it should be understood that the Fountain Code Generator 171, Digital Watermark Embedder 172 and image (I) may be housed and operated in a portable device like the smartphone which includes Display 173. In other configurations, a portable device hosting the Display 173 communicates with a remotely-device that hosts the Fountain Code Generator 171, Digital Watermark Embedder 172 and/or Image 174.)

Embedded image versions Iw1 . . . Iwn may be stored or buffered for cycling for display on Display 173. For example, if 24 image versions are embedded with data blobs, and if Display 173 has a frame rate of 24 frames per second, then the 24 embedded image versions can be collectively cycled once per second (each image version is shown for $1/24^{th}$ of a second). Embedded image versions can be repeatedly cycled through the display one after another, e.g., for a predetermined time (e.g., 5-10 seconds) or until stopped by the user or point of sale terminal. For example, the user or terminal may communicating a successful read to the virtual wallet which terminates display. To a human observer of the cycled images, it appears that a static image is being displayed since the changes in the different image versions are digital watermarking, which are generally imperceptible to the human eye. This can be referred to as a "static image display effect".

Returning to Fountain Code Generator 171, one configuration includes a non-singular random binary nxn matrix, where n is the payload's bit length. So, for the above 880 bit payload (912 including CRC bits) example, a 912×912 matrix is provided. The matrix can be processed with a dot product of the payload (912 bits) to yields y1-yN outputs. Continuing this example, fountain code outputs each include, e.g., 120 bits. A matrix index can be combined with the outputs including, e.g., 5 additional bits per output. The index can be specifically associated with individual outputs yN, can be associated with a group of y outputs, and/or can be associated with the matrix itself. The 125 bits can be error protected, e.g., by appending CRC bits (e.g., 24 bits for a total output data blob YN bit count of 149 bits per data blob). Error protection can be provided by the Fountain Code Generator 171 or the Digital Watermark Embedder 172, or both. For a typical application, about 6-180 data blobs can be used to reconstruct a message. In the 880 bit payload example, if 32 output blobs are used, then 32 corresponding image versions (each individual image version having one of the 32 data blobs digitally watermarked therein) can be embedded in separate versions of the image for display on the smartphone as discussed above. Instead of operating on a bit by bit manner, the Fountain Code Generator 171 can be configured to operate on longer codes, such as with Galois Fields (e.g., GF(256)) discussed in U.S. Pat. Nos. 7,412,641, 7,971,129 and 8,006,160, which are each hereby incorporated herein by reference in its entirety.

From a detector side, e.g., analyzing image data representing some or all of the embedded image versions Iw1-IwN displayed on the Display 173, constructing the payload can begin as soon as a data blob has been decoded from a digital watermark. That is, not all data blobs need to be recovered first before payload reconstruction is initiated with a corresponding erasure code decoder (e.g., in one above example, a corresponding non-singular matrix).

Of course, different payload sizes, error correction bit size and techniques, image version numbers, data blob outputs, intermediate outputs and erasure code generator configurations can be used. Thus, the above examples and embodiments are not intended to be limiting. Additionally, a payload may be segmented prior to fountain code encoding, with each segment having a corresponding number of output blobs. And, other related coding schemes can be used with cycling imagery (including video frames) such as Raptor codes and LT codes.

Of course, different watermark embedding strengths can be used. A relatively higher strength may affect visibility. To help offset visibility, we can use a human perceptibility map where an image is analyzed to find areas that will effectively hide a digital watermark and/or identify those areas which may result in visual artifacts if a digital watermark is hidden therein. A map can be created to avoid such poor hiding areas, or to embed in those areas at a relatively lower embedding strength. Calculating a perceptual map takes processing resources. To avoid calculating a map for each embedding instance of the same image, a map can be reused. For example, in the above FIG. 16 example, the Digital Watermark Embedder 172 may consult a perceptual map to help guide embedding. When using a still image, and since multiple versions of Image (I) 174 are being used, which each preferably include the same image content, a perceptual map can be calculated once, and then reused for each embedding of the image versions. In some cases, the map can be generated as soon as a user identifies an image to be used as transaction graphic, e.g., during registration or virtual wallet set up, which are prior to transactions.

Another way to avoid visual perceptibility of embedded watermarks is to vary embedding strengths based on timing or device sensor feedback. For example, a user may instruct their virtual wallet to display an image for optical sensing. The displayed, cycled images may be embedding with a relatively lower embedding strength for a predetermined time, e.g., the first 0-3 seconds which may correspond to the average time it takes a user to present the smartphone display to an optical reader. Then, for a second time period, e.g., for the next 3-7 seconds, the watermark strength of the displayed, cycled images is pumped up to a relatively stronger level since the display will be pointed at the optical reader, away from human observation.

Instead of using predetermined time periods, the embedding strength may depend on device sensor feedback. For example, after initiating display of imagery, the smartphone may user gyroscope information to make embedding strength decisions. For example, after first movement (corresponding to positioning the display to an optical reader), the embedding strength may be increased, and after one or more movement detections, the embedding strength may be decreased (e.g., corresponding to movement away from the camera). Of course, such gyroscope movements can be analyzed to identify user tendencies, and the embedder can be trained to recognize such movements to optimize watermark embedding strength.

Some of the above embodiments discuss a virtual wallet operating on a smartphone to cause display of a relatively large payload. Our inventive techniques can be applied in a reverse manner, e.g., to a point of sale display which displays cycling imagery to a user's smartphone. A payload can be communicated from the point of sale to a smartphone's virtual wallet. This may be used as a confirmation of a transaction, or it may be as a transaction identifier which can be communicated by the smartphone to a $3^{rd}$ party (e.g., a credit card vendor, a PayPal like service, etc.). The transaction identifier can be supplemented with account information by the virtual wallet to identify an account associated with the virtual wallet. The $3^{rd}$ party uses the transaction identifier and the account information to facilitate payment to the vendor. A confirmation of payment can be transmitted to the vender (e.g., from information included or associated with the transaction identifier) and/or virtual wallet. Some users may prefer this system since financial information is not transmitted from the user to the retailer, but from the retailer to the user, to the $3^{rd}$ party.

In another embodiment, we use high frequency audio to convey a relatively large payload for use in a virtual wallet transaction. For example, smartphone includes a transmitter (e.g., a speaker). The transmitter emits high frequency audio to a receiver. The high frequency audio includes a relatively large payload. At a point of sale check out, the smartphone is positioned in proximity of a receiver at the point of sale location. High frequency audio is emitted from the smartphone, which is received by the point of sale receiver. The payload is decoded from the received audio, and the transaction proceeds. The high frequency audio encoding and transmission techniques disclosed in Digimarc's application Ser. No. 14/054,492, issued as U.S. Pat. No. 9,305,559, filed Oct. 15, 2013, which is hereby incorporated herein by reference in its entirety, can be used in these virtual wallet applications.

A high frequency audio (or audible audio) channel can be used to establish bi-directional communication between a virtual wallet and a point of sale location. A financial transaction can proceed once communication is established. For example, a virtual wallet can cause its host smartphone to transmit a known high frequency audio message, e.g., the message is known to both the virtual wallet and to a receiver. The receiver determines signal errors or a measure of signal error and communicates such back to the smartphone. The return communication can use Bluetooth, high frequency audio, radio frequency or audible range audio, or the like. The virtual wallet uses this return error signal to adjust (e.g., increase or decrease), if needed, the level of error correction and/or signal strength for it next transmitted audio signal.

In another case, a point of sale receiver expects both captured audio+captured imagery to process or complete a financial transaction. A virtual wallet can cause imagery to be cycled on its display, as discussed above. A high frequency audio signal is generated to cooperate with presented imagery. For example, presented imagery may include financial credit card or account information, and the transmitted high frequency audio signal may include an associated pin for the financial information, an encryption key to decrypt the imagery payload, or an expected hash of the imagery payload. The receiver may request—through a high frequency audio channel—that the virtual wallet transmit the corresponding audio message once the imagery is successfully received. Of course, a transmitted audio signal (including, e.g., the pin, hash or key) may prompt a receiver to enable its camera to read a to-be-presented display screen.

Visual Interfaces for Wearable Computers

The visual constructs provided above can also be utilized both in a wristwatch form-factor, and for users wearing glasses.

The paradigm of card selection can leverage the inherit properties of a watch form factor to facilitate selection. One implementation may consist of the user running a finger around the bezel (device presumed to be circular for this example), to effect scrolling through the stack of cards. Simple motion of the watch may facilitate the same navigation by tilting the watch (e.g., rotation at the wrist). Payment would be facilitated the same way by showing the wearer's wrist watch to the cooperating device.

Figure 11:
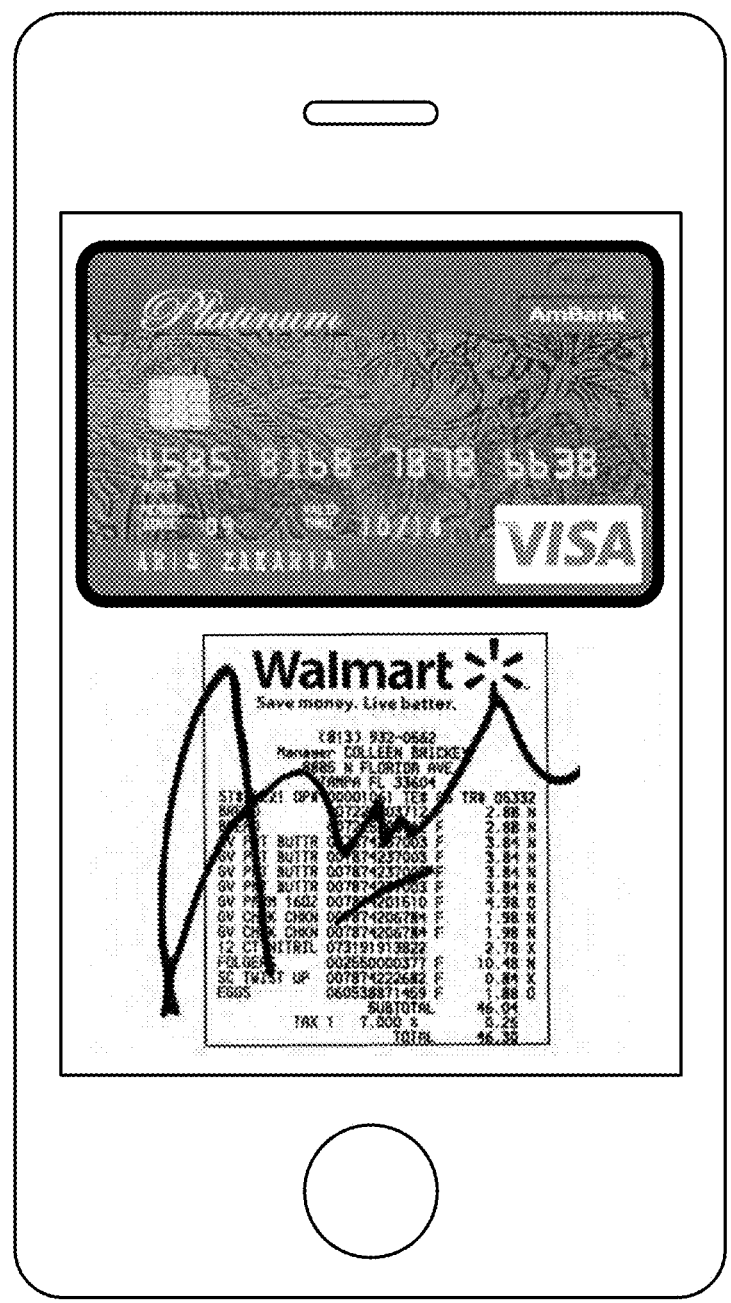
FIG. 11 shows a payment user interface that presents a tally of items for purchase together with payment card artwork, and also provides for user signature.

For users of headworn devices, such as the Google Glass product, the selection and validation process may occur through gaze tracking, blinking or any other known UI construct. Associated with the glasses would be a secondary digital device containing a display (a smartphone, a digitally connected watch such as the Pebble, or possibly a media player). The selected card would be rendered on the secondary device to complete the transaction as before. Alternatively, a portable user device can project a display, for sensing by the POS system Visual Tallies FIG. 11 shows an arrangement in which a checkout tally is presented on the user's smartphone as items are identified and priced by a point of sale terminal. In this embodiment, a user "signs" the touchscreen with a finger to signify approval.

A signature is technically not required for most payment card transactions, but there are advantages to obtaining a user's signature approving a charge. For example, some transaction networks charge lower fees if the users' express affirmance is collected. A finger-on-touchscreen signature lacks the fidelity of a pen-on-paper signature, but can still be distinctive. As part of a process of registering cards in a virtual wallet, a user's touchscreen signature can be collected. This signature, or its characterizing features, can be sent to one or more of the parties in the transaction authorization process shown in FIG. 5, who can use this initial signature data as reference information against which to judge signatures collected in subsequent transactions.

Alternatives to signatures can include finger or facial biometrics, such a thumbprint on the user's screen or capture of face using camera functions, or voiceprint, etc.

In the prior art, POS receipts detail items purchased in the order they are presented at checkout—which is perhaps the least useful order. An excerpt from such a receipt is shown in FIG. 12A. In accordance with a further aspect of the present technology, user preference information is stored in the phone and identifies the order in which items should be listed for that user.

FIG. 12B shows an alphabetical listing—permitting the user to quickly identify an item in the list. FIG. 12C shows items listed by price—with the most expensive items topping the list, so that the user can quickly see where most of the money is being spent.

FIG. 12D breaks down the purchased items by reference to stored list data. This list can be a listing of target foods that the user wants to include in a diet (e.g., foods in the Mediterranean diet), or it can be a shopping list that identifies items the user intended to purchase. The first part of the FIG. 12D tally identifies items that are purchased from the list. The second part of the tally identifies items on the list that were not purchased. (Some stores may provide "runners" who go out to the shelves to fetch an item forgotten by the shopper, so that it can be added to the purchased items before leaving the store.) The third part of the FIG. 12D tally identifies items that were purchased but not on the list (e.g., impulse purchases). Breakdown of purchased items in this fashion may help the user reduce impulse purchases.

Image-Based Authentication

An additional layer of security in mobile payment systems can make use of imagery, e.g., captured by the smartphone.

Figure 13C:
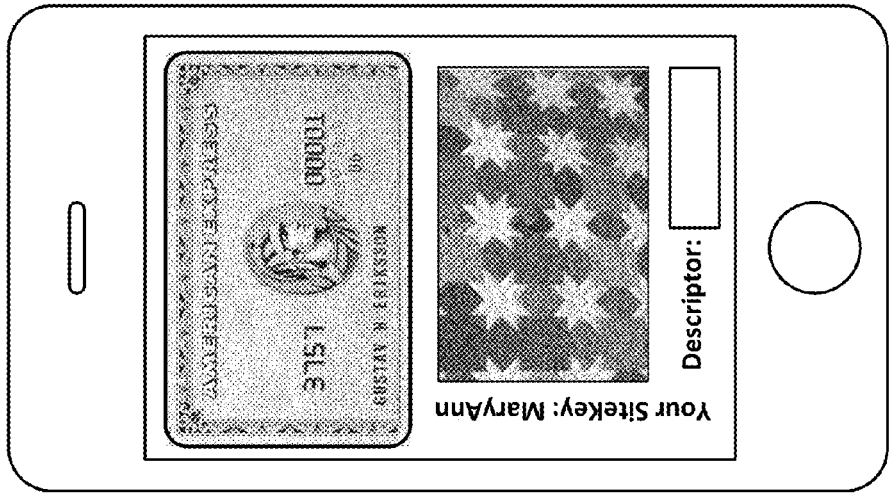
FIGS. 13A-13C show how authentication can employ steganographically-conveyed context data, an anti-phishing mutual validation system, and signature collection—all for increased security.
Figure 13B:
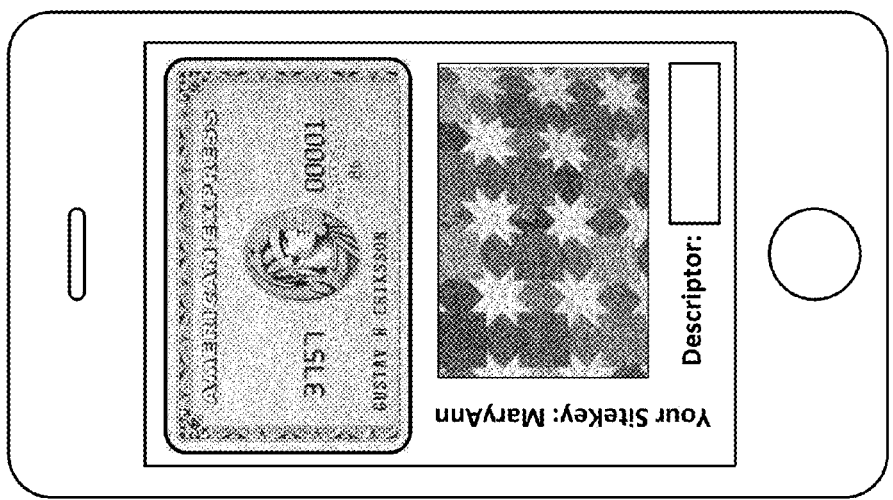
Figure 13A:
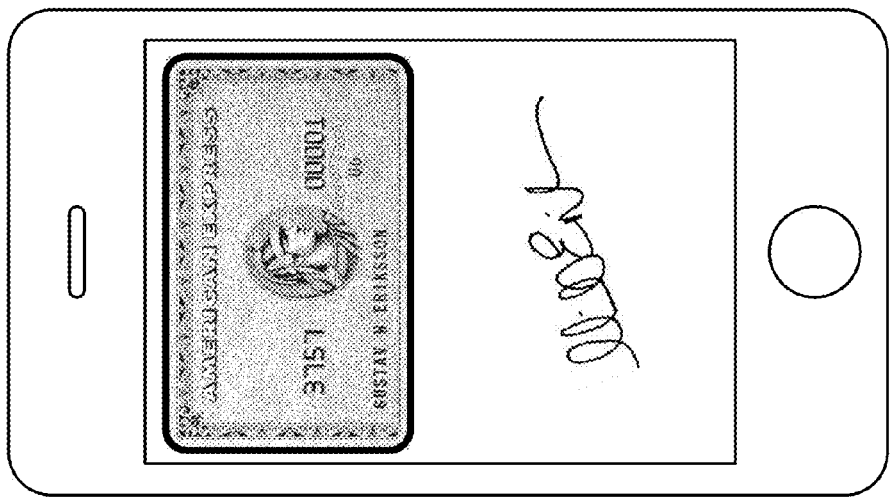

FIGS. 13A-13C illustrate one such arrangement, used to further secure an American Express card transaction. The detailed arrangement is akin to the SiteKey system, marketed by RSA Data Security.

In particular, after the user selects the American Express virtual card from the smartphone wallet, the phone sends related data to a cooperating system (which may be in data communication with American Express or RSA). Once the user/device/card is identified by such sent data, the cooperating system provides a challenge corresponding to that user/device/card for presentation on the phone screen. This challenge includes an image and a SiteKey phrase. In FIG. 13A the image is an excerpt of a quilt image, and the SiteKey is the name MaryAnn. Unlike the SiteKey system, however, the image is drawn from the user's own photo collection, stored on the smartphone that is now engaged in the authentication process. (In the present case, the user may have snapped a picture of the quilt while visiting a gift shop on vacation.) User-selection of one of the user's own images enables the user to select a SiteKey phrase that has some semantic relationship to the image (e.g., the user may have been with a friend MaryAnn when visiting the shop where the quilt was photographed).

The user verifies that the quilt image and the SiteKey word are as expected (to protect against phishing), and then is prompted to enter a Descriptor corresponding to the image. In the present case the Descriptor is the word Napa. (Again, this word may be semantically related to the displayed image and/or the SiteKey. For example, it may have been during a vacation trip to Napa, Calif., that the user and MaryAnn visited the shop where the quilt was photographed.)

A cryptographic hash of the user-entered Descriptor is computed by the smartphone, and transmitted to the cooperating system for matching against reference Descriptor data earlier stored for that user's American Express account. If they match, a message is sent to the smartphone, causing it next to solicit the user's signature, as shown in FIG. 13C. (As in FIG. 11, the signature screen may also include a tally of the items being purchased, or other transaction summary.) After entry of the user's signature or other biometric indicia (and, optionally, checking of signature features against stored data), the transaction proceeds. In addition, or alternatively, the user's image or a user selected image may appear on the merchant's terminal screen permitting a challenge response verification of identity by the store clerk. A facial image can be manually checked and/or compared using facial biometrics algorithms.

Another challenge-response security system employs information harvested from one or more social network accounts of the user, rather than from the phone's image collection. For example, a user can be quizzed to name social network friends—information that may be protected from public inspection, but which was used in an enrollment phase. At both the enrollment phase, and in later use, the actual friends' names are not sent from the phone. Instead, hashed data is use to permit the remote system to determine whether a user response (which may be selected from among several dummy data, as above) is a correct one.

Still other information that can be used in challenge-response checks is detailed in published application 20120123959, which is hereby incorporated herein by reference in its entirety.

Figure 14:
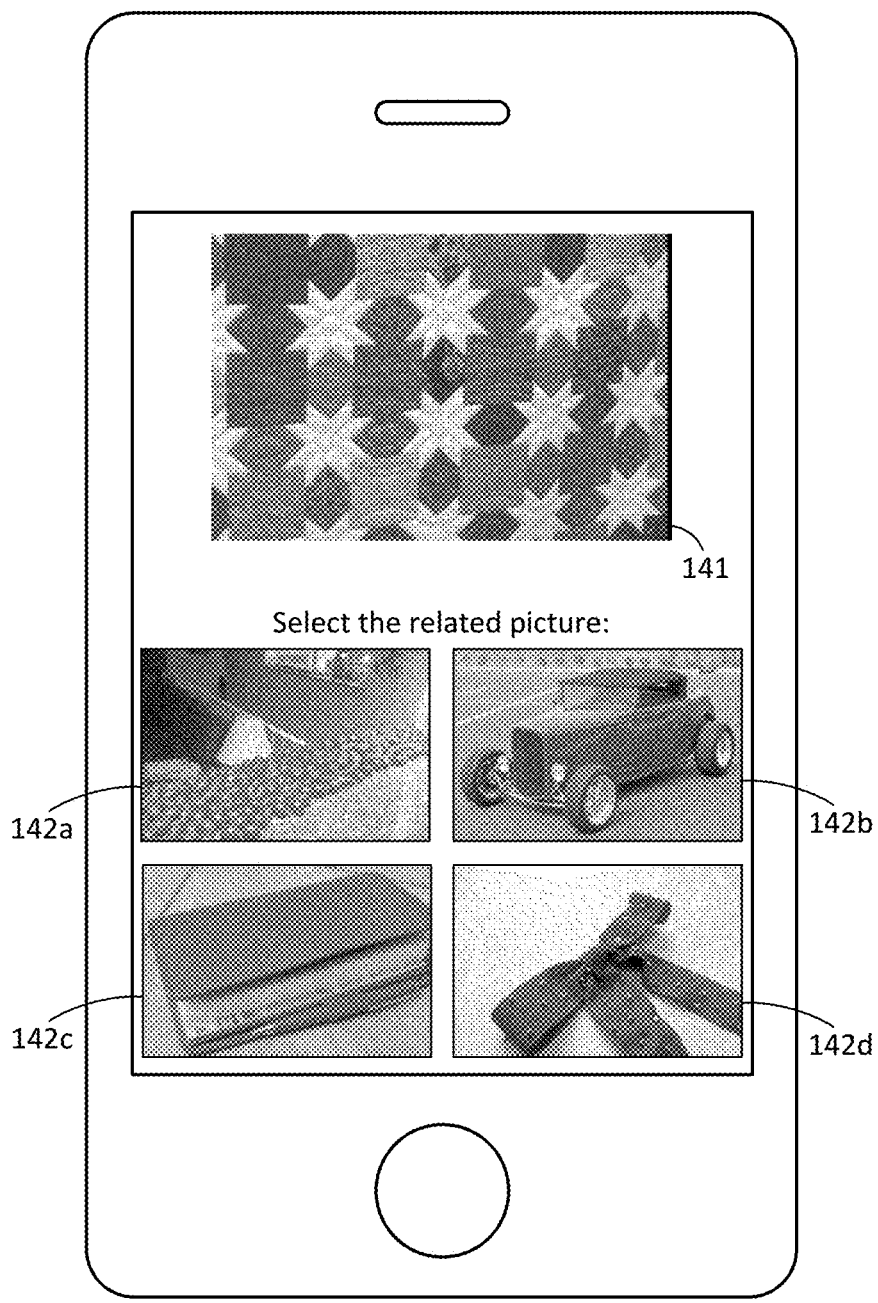
FIGS. 14 and 15 show an authentication arrangement using photographs earlier captured by the user and stored on the smartphone.
Figure 15:
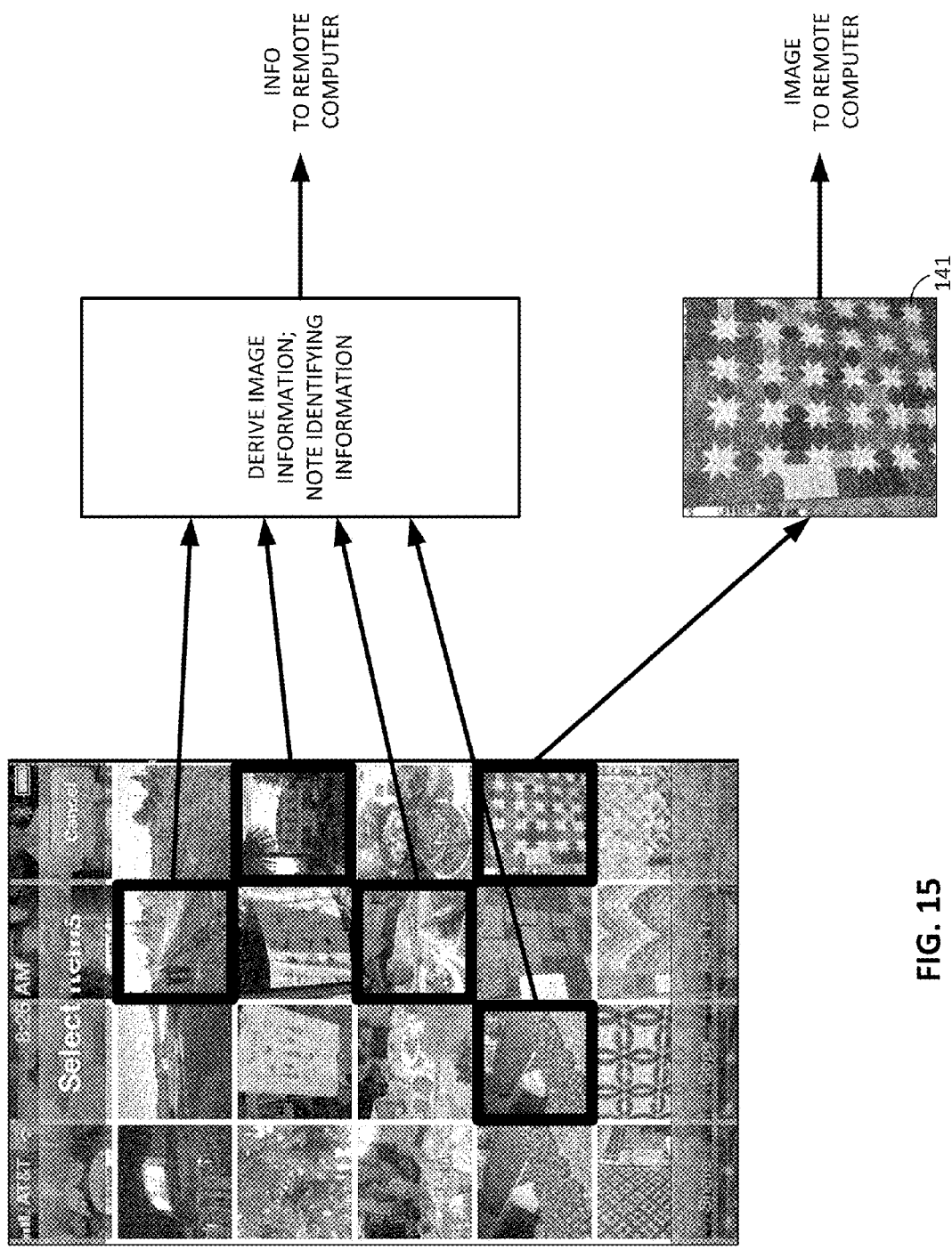

FIGS. 14 and 15 show a different authentication procedure. In this arrangement a challenge image 141 is presented, and the user is instructed to tap one of plural candidate images to identify one that is related to the challenge image. The correct, corresponding, image (142a in this case) is selected from the user's own collection of smartphone pictures (e.g., in the phone's Camera Roll data structure), as is the challenge image 141. If the user does not pick the correct candidate image from the presented array of images, the transaction is refused.

FIG. 15 details a preceding, enrollment, phase of operation, in which images are initially selected. The user is instructed to pick one image from among those stored on the phone. This user-picked image 141 is used as the reference image, and a copy of this image is sent to a cooperating system (e.g., at a bank or RSA Security). The user is next instructed to pick several other images that are related to the reference image in some fashion. (For example, all of the picked images may have been captured during a particular vacation trip.) These latter images are not sent from the phone, but instead derivative data is sent, from which these pictures cannot be viewed.

In the illustrated example, the user selects images taken during the vacation to Napa. An image of the quilt, photographed in the gift shop, is selected by the user as the reference image 141. This picture is a good choice because it does not reveal private information of the user (e.g., it does not depict any family members, and it does not reveal any location information that might be sensitive), so the user is comfortable sharing the image with an authentication service. The user then picks several other images taken during the same trip for use as related, matching images. In FIG. 15, the user-picked related images are indicated by a bold border. One shows two figures walking along a railroad track. Another shows a palm tree in front of a house. Another shows plates of food on a restaurant table. Another shows red tomatoes arrayed along a counter. All are related by common geography and time interval (i.e., a vacation to Napa).

For the user-picked related images, no copies are sent from the phone. Instead, software in the phone derives image feature information. This image feature information may comprise, e.g., an image hash, or fingerprint, or color or texture or feature histograms, or information about dominant shapes and edges (e.g., content-based image descriptors of the sort commonly used by content-based image retrieval (CBIR) systems), etc. This derived information is sent from the phone for storage at the authentication service, together with identifying information by which each such related image can be located on the user's smartphone. (E.g., file name, image date/time, check-sum, and/or image file size.)

Returning to FIG. 14, when authentication is required (e.g., after a user/device/card has been identified for a transaction), the remote system sends the reference image 141 for display on the smartphone. The remote system also sends identifying information for one of the several related images identified by the user (e.g., for the picture of the tomatoes on the counter). The remote system also sends several dummy images.

The smartphone uses the identifying information (e.g., the image name) to search for the corresponding related image in the smartphone memory. The phone next presents this image (142*a*), together with the dummy images received from the authentication service (142*b*, 142*c*, 142*d*), on the phone display. The user is then invited to pick one of the plural candidate images 142 that is related to the reference picture 141.

The user's choice is compared against the correct answer. For example, the remote system may have instructed the smartphone to present the matching image (recalled from the phone's memory, based on the identification data) in the upper left position of the array of pictures. The phone then reports to the remote system the location, in the array of candidate pictures, touched by the user. If that touch is not in the upper left position, then the remote system judges the authentication test as failed.

In other arrangements, the location of the user's tap is not reported to the remote system. Instead, the smartphone computes derived information from the image tapped by the user, and this information is sent to the remote system. The remote system compares this information with the derived information earlier received for the matching (tomatoes) image. If they do not correspond, the test is failed.

In still other arrangements, the pass/fail decision is made by the smartphone, based on its knowledge of placement of the matching image.

Although not evident from the black and white reproduction of FIG. 14, each of the candidate images 142*a*-142*d* is similar in color and structure. In particular, each of these images has a large area of red that passes through the center of the frame, angling up from the lower left. (That is, the roadster car is red, the notebook is red, and the ribbon bow is red.) This is possible because, in the illustrated embodiment, the derived information sent from the phone during the enrollment phase included color and shape parameters that characterized the matching images selected by the user. In selecting dummy images, the remote system searched for other images with similar color/shape characteristics.

This feature is important when the reference image and the matching images are thematically related. For example, if the user-selected reference and matching photos are from a camping trip and all show wilderness scenes, then a matching photo of a mountain taken by the user might be paired with dummy photos of mountains located by CBIR techniques. By such arrangement, the thematic relationship between a matching image and the reference image does not give a clue as to which of the candidate images 142 is the correct selection.

In the FIG. 14 example, the tomatoes photo was used as the matching image. The next time authentication is required, another one of the matching images earlier identified by the user can be used (e.g., the photo of a palm tree in front of a house).

It will be recognized that only the true user will be able to discern a relationship between the reference image 141, and one of the displayed candidate images 142, because only the true user knows the context that they share. Moreover, this authentication technique relies on images captured by the user, rather than "canned" imagery, as employed in the prior art.

Card Standards, Etc.

Conventional magstripe credit cards conform to ISO standards 7810, 7811 and 7813, which define the physical and data standards for such cards. Typically, the data on the magstripe includes an account number, an owner name, a country code, and an card expiration date.

"Chip cards" include a chip—typically including a processor and a memory. The memory stores the just-listed information, but in encrypted form. The card employs a variety of common digital security techniques to deter attack, including encryption, challenge-response protocols, digital signatures, etc. Entry of a user's PIN is required for most transactions. Again, an ISO standard (7816) particularly defines the card requirements, and a widely used implementation follows the EMV (EuroPay/MasterCard/Visa) standard. (An updated version of EMV, termed EMV Lite, is being promoted by Morpho Cards, GmbH.)

Artisans commonly speak of "static" and "dynamic" authentication methods.

"Static" authentication methods build on those known from magnetic stripe cards. In static authentication, information is conveyed uni-directionally, i.e., from the card, possibly through an intermediary (e.g., a POS system) to a testing system (e.g., a card issuer). Static techniques can employ digital signatures, public-private keys, etc. For example, the user's name may be hashed, digitally signed with a private key associated with the system (or issuer), and the results stored in a chip card for transmission to the POS system. The POS system receives this encrypted data from the card, together with the user name (in the clear). It applies the corresponding public key to decrypt the former, and compares this with a hash of the latter.

The present technology can be employed in systems using such known static authentication, without any system alterations. Moreover, the present technology affords protection against replay attacks (e.g., through context-based techniques)—a liability to which conventional static authentication techniques are susceptible.

The more sophisticated authentication technique is so-called "dynamic authentication." This involves a back-and-forth between the payment credential and the testing system, and may comprise challenge-response methods.

With chip cards, the card-side of the transaction is conducted by the chip, for which the POS terminal commonly has a two-way dedicated interface. But the smartphone screen used in embodiments of the present technology—which optically provides information to the cooperating system—cannot reciprocate and receive information from that system.

Nonetheless, the present technology is also suitable for use with dynamic authentication methods. The communication back from the system to the smartphone can be via signaling channels such as radio (NFC communication, WiFi, Zigbee, cellular) or audio. Optical signaling can also be employed, e.g., a POS terminal can be equipped with an LED of a known spectral characteristic, which it controllably operates to convey data to the phone, which may be positioned (e.g., laying on a checkout conveyor) so that the phone camera receives optical signaling from this LED.

Many chip-card dynamic authentication methods rely on key data stored securely in the chip. The same secure methods can be implemented in the smartphone. (Many Android phones already include this, to support the Google Wallet and similar technologies.) For example, the RSA secure architecture for SIM (microSD) cards or NFC chips, employing a tamper resistant Secure Element (SE) and a single wire protocol (SWP), can be used. The keys and other data stored in such arrangement can be accessed only via encrypted protocols.

In one particular implementation, the keys are accessed from the SE in the smartphone, and employed in a static authentication transaction (e.g., with information optically conveyed from the smartphone screen). The remote system may respond to the phone (e.g., by radio) with a request to engage in a dynamic authentication, in which case the smartphone processor (or the SE) can respond in the required back-and-forth manner.

In other arrangements, the key data and other secure information is stored in conventional smartphone memory—encrypted by the user's private key. A cloud resource (e.g., the card issuer) has the user's public key, permitting it to access this secure information. The POS system can delegate the parts of the transaction requiring this information to the issuing bank, based on bank-identifying information stored in the clear in the smartphone and provided to the POS system.

As noted, while chip cards are appealing in some aspects, they are disadvantageous because they often require merchants to purchase specialized reader terminals that have the physical capability to probe the small electrical contacts on the face of such cards. Moreover, from a user standpoint, the card is typically stored in an insecure container—a wallet. In the event a card is stolen, the only remaining security is a PIN number.

As is evident from the foregoing, embodiments of the present technology can employ the standards established for chip card systems and gain those associated benefits, while providing additional advantages such as cost savings (no specialized reader infrastructure required) and added security (the smartphone can provide many layers of security in addition to a PIN to address theft or loss of the phone).

The artisan implementing the present technology is presumed to be familiar with magstripe and chip card systems; the foregoing is just a brief review. Additional information is found, e.g., in the text by Rankl et al, *Smart Card Handbook*, $4^{th}$ Ed., Wiley, 2010, and in the white paper, "Card Payments Roadmap in the United States: How Will EMV Impact the Future Payments Infrastructure?," Smart Card Alliance, Publication PC-12001, January, 2013.

Notifications and Transaction Receipts, etc.:

A virtual wallet can facilitate receipt transmission and management. As part of a transaction checkout, the virtual wallet may request a receipt to be added to or accessible by the wallet—perhaps stored locally on the user device and/or in the cloud associated with a user or device account. For example, the virtual wallet communicates an account identifier, device ID or address to a participating terminal or vendor. In response, the terminal or vendor forwards the transaction receipt to the account, device or address. The user may be prompted through a UI provided by the virtual wallet to add searchable metadata about the transaction or receipt (e.g., warranty information). In other cases, searchable metadata is collected by the virtual wallet itself in addition to or without user intervention. Searchable metadata may be collected, e.g., by accessing and using transaction time, retailer name and location, items purchased, retention information, OCR-produced data if the receipt is in image form or .pdf format, etc. In some cases the receipt can be provided by the retailer with searchable text (e.g., in an XML file), e.g., including items purchased, return information, warranty information, store location and hours, price, etc. Searchable text can be indexed to facilitate rapid future searching. The receipt is accessible through the virtual wallet, e.g., by a user selecting a UI-provided icon next to a corresponding transaction.

The virtual wallet preferably provides a UI through which receipts and other transaction information may be searched. The user inputs information, e.g., types information or selects categories, products, retailers from scrollable lists, via the search UI. After a search is launched, corresponding receipt search results are represented on the display for review by the user.

We mentioned above that receipts can be marked for retention. This is helpful, e.g., for items under warranty. Retention information can be used by the wallet to help expire receipts and other transaction information. For example, a user purchases a TV at Wal-Mart and a receipt is delivered for access by the virtual wallet. (In some cases the virtual wallet may receive a notification that a receipt is available for retrieval, and access a remote location to obtain receipt information.) Metadata is entered or accessed for the receipt and retention data is indexed or stored in an expiration table or calendar. The virtual wallet uses the expiration table or calendar to expire receipts no longer deemed important or needed. The term "expire" in this context may include deleting the receipt, deleting metadata associated with the receipt, and/or updating any remote storage of such.

Retention data can be augmented with any auction related information. For example, we mentioned above that a certain financial bidder may offer an extended warranty if a transaction is made using their account or service. Such a warranty extension may be added to the retention information so a receipt is not prematurely expired.

Receipts and the metadata associated with such can be updated to reflect returns or refunds.

The searchable metadata may also include notification information. For example, a user may be on the fence whether to keep the latest electronic gizmo purchased on a whim last week. In this case the use has 15 days (or other according to the store's return policy) to return the item. Notification information can be stored and calendared for use by the virtual wallet (or a cooperating module) to send the user a reminder, e.g., via email, SMS or display notification pop-up via a UI, so that the 15 days doesn't come and go without notice.

Notifications need not be limited to receipts and warranty information. The virtual wallet may manage and provide many different types of notifications. For example, bill-payment due dates, account balances, credit limits, offers, promotions and advertising are just a few examples of such. Push-messages may be generated for urgent items in addition to having some type of a visual cue or icon within the virtual wallet that would indicate that my attention is needed. For example, a particular card or account in FIG. 3A may have a notification associated with it. (E.g., the user may have forgotten to authorize a monthly payment by its due date.) The depicted card may jiggle, glow, shimmer, flash, strobe and/or break into an animated dance when the virtual wallet is accessed. This type of notification will visually alert the user to investigate the card further, and upon accessing such (e.g., by double tapping the animated card) the notification can be further displayed.

Medical and insurance information may also be stored and managed in a virtual wallet. In addition to a health insurance card, users have car insurance card(s), Medicare card(s), an Intraocular Lens card, and a Vaccess Port card, etc. Unlike bank cards, some of this info is preferably accessible without unlocking a mobile device that is hosting the virtual wallet, e.g., because if a user needs emergency medical care, they may not be conscious to unlock the device. Access to such emergency medical information may be accomplished by adding an Emergency Medical button to a device's unlock screen similar to the Emergency Call button. A user can determine which information they want to provide access to via an Emergency Medial button through an operating systems settings screen or an access user interface associated with the virtual wallet. In another embodiment, emergency responders have an RFID card, NFC device or a digitally watermarked card that can be sensed by the mobile device to trigger unlocking the screen of a mobile device. In other cases, desired medial or insurance information is information is available on an initial splash screen, even if the phone is locked, and without needing to access an Emergency Medical button.

Of course, some or all the information hosted by the virtual wallet can be stored in the cloud or at a remote location so that it is accessible from various user devices programmed with the virtual wallet (e.g., a virtual wallet app) or to cooperate with the virtual wallet and through which a user's identity is authenticated.

Game Consoles and Physical Sales of Virtual Items:

Another device on which a virtual wallet can operate on is a game console. Examples of gaming platforms include Microsoft's Xbox 360, Sony's PlayStation, Nintendo's DS and Wii Kyko PlayCube, OnLive's MicroConsole (a cloud-based gaming console), etc.

One advantage of coupling a virtual wallet to a game console is the ability to monetize and transfer virtual items. Consider the following: after a long night of gaming a user finally wins a rare virtual prize, e.g., a unique power, token, provisions, code, level access, spell or weapon. The virtual prize can be stored or accessed within the user's virtual wallet. For example, the prize may be represented by an XML file, an access code, a cryptographic code, software code, or a pointer to such.

The virtual wallet can facilitate the on-line sale or transfer (e.g., via eBay) of the virtual prize for real money or credit. The wallet may include a virtual prize directory, folder or screen. An eBay (or sell) icon may be displayed next to the virtual prize to allow a user to initiate a transfer, auction or sale of the virtual prize. Selecting the icon initiates an offer to sell, and prompts the virtual wallet to manage the interaction with eBay, e.g., by populating required For Sale fields gathered from the virtual prize's metadata, or prompting the user to insert additional information. (The virtual wallet can access an eBay API or mobile interface to seamlessly transfer such data.)

Upon a successfully sale, the virtual wallet can be used to transfer the virtual prize to the winning purchaser using the techniques (e.g., purchase) discussed in this document.

Anonymous Trust; Pick-Pocketing; and Security:

A virtual wallet may also provide an indication of trust. A user may accumulate different trust indicators as they forage online, participate in transactions and interact in society. For example, a user may receive feedback or peer reviews after they participate in an online transaction, auction or in a retail store. Another trust indicator may be a verification of age, residency and/or address. Still another trust indicator may be a criminal background check performed by a trusted third party. The virtual wallet may aggregate such indicators from a plurality of different sources to determine a composite trust score for the user. This trust score can be provided to potential bidder in a financial auction as a factor in deciding whether to offer a bid, and the content of such. The trust score can also be provided as the user interacts through social media sites.

In some cases, the trust score is anonymous. That is, it provides information about a user without disclosing the user's identity. A user can then interact online in an anonymous manner but still convey an indication of their trustworthiness, e.g., the virtual wallet can verify to others that a user is not a 53 year old pedophile, while still protecting their anonymity.

To help prevent digital pickpocketing a virtual wallet may be tethered (e.g., include a cryptographical relationship) to device hardware. For example, a mobile device may include an SID card identifier, or may include other hardware information, which can be used as a device identifier. A virtual wallet may anchor cards within the wallet to the device identifier(s) and, prior to use of a card—or the wallet itself—checks the device identifier(s) from the device with the device identifier(s) in the virtual wallet. The identifiers should correspond in a predetermined manner (e.g., cryptographical relationship) before the virtual wallet allows a transaction. This will help prevent a wallet from being copied to a device that is not associated with the user. (Of course, a user may authorize a plurality of different devices to cooperate with their virtual wallet, and store device identifiers for each.)

In some cases, a virtual wallet may send out a notification (e.g., to the user, credit reporting agency, or law enforcement) if the virtual wallet detects unauthorized use like use of the wallet on an unauthorized device.

In other cases, the virtual wallet gathers information associated with a user's patterns and purchases. After building a baseline, it can notify a user, financial vendor or others when it detects activity that looks out of character (e.g., suspected as fraud) relative to the baseline. For example, the baseline may reflect a geographic component (e.g., North America) and if spending is detected outside of this component (e.g., in Europe) then a notification can be generated and sent. The baseline may also access or incorporate other information to help guide its decision making. For example, the virtual wallet may access a user's online or locally stored calendar and determine that the user is traveling in Europe on vacation. So the geographical component is expanded during the vacation time period and a notification is not sent when European spending is detected.

Combinations

Some combinations supported this disclosure include the following. Of course, the following is no-where near an exhaustive listing, since there are many, many other combinations that will be readily apparent from the above written description.

A1. A method employing a user's portable device, the device including a display, one or more processors and a sensor, the method including acts of:

receiving information from the sensor, the information corresponding to a positioning or relative movement of the portable device;

using the one or more processors, and based at least in part on the information, changing a digital watermark embedding process;

using the one or more processors, embedding a digital watermark in imagery using the changed digital watermark embedding process;

providing the embedded imagery for display.

A2. The method of A1 in which the sensor comprises a gyroscope.

A3. The method of A1 in which said changing a digital watermark embedding process comprises changing a relative embedding strength.

B1. A portable device comprising:

a touch screen display;

a sensor to obtain information corresponding to a positioning or relative movement of the portable device;

memory storing an image; and one or more processors configured for:

changing a digital watermark embedding process based on information obtained by said sensor;

embedding a digital watermark in the image using the changed digital watermark embedding process;

controlling display of the embedded image on the touch screen display.

B2. The portable device of B1 in which the sensor comprises a gyroscope.

B3. The portable device of B1 in which the changing a digital watermark embedding process comprises changing a relative embedding strength.

C1. A portable device comprising:
a touch screen display;
a microphone for capturing ambient audio;
memory for storing audio identifiers or information obtained from audio identifiers; and
one or more processors configured for:
  causing the portable device to operate in a background audio collection mode, in which during the mode audio is captured by the microphone without user involvement;
  processing audio captured in the background audio collection mode to yield one or more audio identifiers;
  storing the one or more audio identifiers or information obtained from the one or more identifiers in said memory;
  upon encountering a transmission from a signaling source, determining if the one or more audio identifiers or if the information obtained from the one or more identifiers stored in memory corresponds to the transmission;
  taking an action if there is a correspondence.

C2. The portable device of C1 in which the signaling source comprises an iBeacon or Bluetooth transmitter.

C3. The portable device of C2 in which the information obtained from the one or more audio identifiers comprises a discount code or coupon, and in which the action comprises applying the discount code or coupon to a financial transaction involving the portable device.

C4. The portable device of C1 in which the processing audio comprises extracting fingerprints from the audio.

C5. The portable device of C1 in which the processing audio comprises decoding digital watermarking hidden in the audio.

C6. The portable device of C1 in which the action comprises prompting the user via a message displayed on the touch screen display.

D1. A system comprising:
a portable device comprising: one or more processors, a high frequency audio transmitter and receiver, and a virtual wallet stored in memory, the virtual wallet comprising financial information;
a retail station comprising: one or more processors, a high frequency audio transmitter and receiver;
in which the virtual wallet configures the one or more processors of the portable device to transmit a known high frequency audio message, the message being known to both the virtual wallet and to the retail station;
in which the one or more processors of the retail station are configured to determine errors associated with the known high frequency audio message and cause an error message to be communicated to the virtual wallet;
and in which the virtual wallet, upon receipt of the error message, configures said one or more processors to transmit the financial information with a high frequency audio signal adapted according to the error message.

Concluding Remarks

From the above description, it will be seen that embodiments of the present technology preserve the familiar ergonomics of credit card usage, while streamlining user checkout. No longer must a user interact with an unfamiliar keypad at the grocery checkout to pay with a credit card (What button on this terminal do I press? Enter? Done? The unlabeled green one?). No longer must the user key-in a phone number on such a terminal to gain loyalty shopper benefits. Additional advantages accrue to the merchant: no investment is required for specialized hardware that has utility only for payment processing. (Now a camera, which can be used for product identification and other tasks, can be re-purposed for this additional use.) And both parties benefit by the reduction in fraud afforded by the various additional security improvements of the detailed embodiments.

Having described and illustrated the principles of our inventive work with reference to illustrative examples, it will be recognized that the technology is not so limited.

For example, while the specification focused on a smartphone exchanging data with a cooperating system using optical techniques, other communication arrangements can be used. For example, radio signals (e.g., Bluetooth, Zigbee, etc.) may be exchanged between the phone and a POS system. Relatedly, NFC and RFID techniques can also be used.

In some embodiments, audio can also be used. For example, card and authentication data can be modulated on an ultrasonic carrier, and transmitted from the phone's speaker to a microphone connected to the POS terminal. The POS terminal can amplify and rectify the sensed ultrasonic signal to provide the corresponding digital data stream. Alternatively, an audible burst of tones within the human hearing range can be employed similarly.

In another audio embodiment, the data is conveyed as a watermark payload, steganographically conveyed in cover audio. Different items of cover audio can be used to convey different information. For example, if the user selects a VISA card credential, a clip of Beatles music, or a recording of a train whistle, can serve as the host audio that conveys the associated authentication/card information as a watermark payload. If the user selects a MasterCard credential, a BeeGees clip, or a recording of bird calls, can serve as the host audio. The user can select, or record, the different desired items of cover audio (e.g., identifying songs in the user's iTunes music library, or recording a spoken sentence or two), and can associate different payment credentials with different of these audio items. The user can thereby conduct an auditory check that the correct payment credential has been selected. (If the user routinely uses a Visa card at Safeway—signaled by the Beatles song clip, and one day he is surprised to hear the BeeGees song clip playing during his Safeway checkout, then he is alerted that something is amiss.)

While watermarking and barcodes have been expressly referenced, other optical communications techniques can also be used. One simply uses pattern recognition (e.g., image fingerprinting, or OCRing) to recognize a payment card by the presented artwork and, in some implementations, read the user name, account number, expiration date, etc., from the artwork.

While the detailed payment arrangements provide card data (e.g., account name and number), from the smartphone to the cooperating system (typically in encrypted form), in other embodiments, such information is not conveyed from the phone. Instead, the phone provides a data token, such as a digital identifier, which serves to identify corresponding wallet card data stored in the cloud. (A related approach is used, e.g., by Braintree's Venmo payment system, which "vaults" the credit card details in a central repository.) Known data security techniques are used to protect the exchange of information from the cloud to the retailer's POS system (or to whatever of the parties in the FIG. 5 transaction system first receives the true card details). The token is useless if intercepted from the phone, because its use cannot be authorized except by using techniques such as disclosed above (e.g., context-based authentication data, digital signatures, etc.).

Token-based systems make it easy for a user to handle loss or theft of the smartphone. With a single authenticated communication to the credentials vault, the user can disable all further use of the payment cards from the missing phone. (The authenticated user can similarly revoke the public/private key pair associated with user through the phone's hardware ID, if same is used.) After the user has obtained a replacement phone, its hardware ID is communicated to the vault, and is associated with the user's collection of payment cards. (A new public/private key pair can be issued based on the new phone's hardware ID, and registered to the user with the certificate authority.) The vault can download artwork for all of the virtual cards in the user's collection to the new phone. Thereafter, the new phone can continue use of all of the cards as before.

Desirable, in such embodiments, is for the artwork representing the wallet cards to be generic, without any personalized identification (e.g., no name or account number). By such arrangement, no personal information is conveyed in the replacement artwork downloaded to the new phone (nor is any personal information evident to a person who might gain possession of the lost/stolen original phone).

In an alternate implementation the virtual card data stored on the phone is logically-bound to the phone via the device ID, so that such data is not usable except on that phone. If the phone is lost or stolen, the issuer can be notified to revoke that card data and issue replacement data for installation on a replacement phone.

In still another embodiment, card data can be revoked remotely in a lost or stolen phone, using the iCloud Find My iPhone technology popularized by the Apple iPhone for remotely locking or wiping a phone.

While any combination of layered security techniques can be employed, one involves public-private key pairs issued to banks that issue payment cards. Among the information conveyed from the smartphone can be credit card account details (name, number, expiration data, etc.) provided to the phone by the issuing bank at time of virtual card issuance, already encrypted by the bank's private key. The POS system can have, stored in memory, the public keys for all credit card-issuing banks. The POS system can apply the different public keys until it finds one that decrypts the information conveyed from the smartphone, thereby assuring that the card credentials are issued by the corresponding bank.

In the detailed arrangements, a POS system makes a context-based assessment using information conveyed from the smartphone (e.g., optically conveyed from its display). In other embodiments, the roles can be reversed. For example, the POS terminal can convey context information to the smartphone, which makes an assessment using context information it determines itself. Some systems use both approaches, with the smartphone testing the POS terminal, and the POS terminal testing the smartphone. Only if both tests conclude satisfactorily does a transaction proceed.

Technology for steganographically encoding (and decoding) watermark data in artwork (and sound) is detailed, e.g., in Digimarc's patent documents U.S. Pat. Nos. 6,614,914, 6,590,996, 6,122,403, 20100150434 and 20110274310, as well as in pending application Ser. No. 13/750,752, issued as U.S. Pat. No. 9,367,770, filed Jan. 1, 2013. Typically, forward error correction is employed to assure robust and accurate optical conveyance of data. Each of the above patent documents is hereby incorporated herein by reference in its entirety.

The steganographic data-carrying payload capacity of low resolution artwork is on the order of 50-100 bits per square inch. With high resolution displays of the sort now proliferating on smartphones (e.g., the Apple Retina display), much higher data densities can reliably be achieved. Still greater data capacity can be provided by encoding static artwork with a steganographic movie of hidden data, e.g., with new information encoded every tenth of a second. Using such techniques, payloads in the thousands of bits can be steganographically conveyed.

Image fingerprinting techniques are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC). SIFT-based approaches for image recognition can also be employed (e.g., as detailed in U.S. Pat. No. 6,711,293). SURF and ORB are more recent enhancements to SIFT. Each of the above patent documents is hereby incorporated herein by reference in its entirety. Each of the above patent documents is hereby incorporated herein by reference in its entirety.

Applicant's other work that is relevant to the present technology includes that detailed in patent publications 20110212717, 20110161076, 20120284012, 20120046071, 20120214515, and in pending applications Ser. No. 13/651,182, issued as U.S. Pat. No. 8,868,039, filed Oct. 12, 2012 and 61/745,501, filed Dec. 21, 2012. Each of the above patent documents is hereby incorporated herein by reference in its entirety.

Related patent publications concerning mobile payment and imaging technologies include 20120303425, 20120024945, 20100082444, 20110119156, 20100125495, 20130085941, 20090276344, U.S. Pat. Nos. 8,423,457, 8,429,407, 8,250,660, 8,224,731, 7,508,954, and 7,191,156. Each of the above patent documents is hereby incorporated herein by reference in its entirety.

Although the detailed description focuses on use of the technology in bricks and mortar stores, the technology is equally useful in making purchases online.

For example, a user may employ a smartphone to browse the web site of an online merchant, and add items to a shopping cart. The merchant may have a dedicated app to facilitate such shopping (e.g., as EBay and Amazon do). At the time for payment, the user (or the web site, or the app) invokes the payment module software, causing one of the depicted interfaces (e.g., FIG. 1 or FIG. 10A) to be presented for user selection of the desired payment card. For example, an app may have a graphical control for selection by the user to activate the payment module. The user then flips through the available cards and taps one to complete the purchase. The payment module determines the device context from which it was invoked (e.g., the Amazon app, or a Safari browser with a Land's End shopping cart), and establishes a secure session to finalize the payment to the corresponding vendor, with the user-selected card. As in the earlier examples, various digital data protocols can be employed to secure the transaction. (In this case, optical communication with the cooperating system is not used. Instead, data is exchanged with the remote system by digital communications, e.g., using a 4G network to the internet, etc.)

While the present technology's robustness to various potential attacks was noted above, the technology also addresses one of the largest fraud channels in the existing credit card system: so-called "card not present" transactions. Many charge transactions are made without presenting a physical card to a merchant. (Consider all online purchases.) If a person knows a credit card number, together with owner name, expiration date, and code on back, they can make a charge. Much fraud results. By the present technology, in contrast, the smartphone serves as the payment credential—the same credential for both online and bricks-and-mortar merchants. For the former its data is presented digitally, and for the latter its data is presented optically—both with reliable security safeguards. As smartphones become ubiquitous, merchants may simply insist on cash if a smartphone is not used, with negligibly few bona fide sales lost as a consequence.

It will be recognized that the detailed user interfaces are illustrative only. In commercial implementation, it is expected that different forms of interface will probably be used, based on the demands and constraints of the particular application. (One alternative form of interface is one in which a virtual representation of a wallet card is dragged and dropped onto an item displayed on-screen that is to be purchased, or is dragged/dropped onto a displayed form that then auto-completes with textual particulars (cardholder name, billing address, card number, etc.) corresponding to the selected card. Such forms of interaction may be particularly favored when using desktop and laptop computers.)

While the focus of the disclosure has been on payment transactions, another use of wallet cards is in identification transactions. There is no reason why driver licenses, passports and other identification documents cannot have virtual counterparts (or replacements) that employ the technology detailed herein. Again, greatly increased security can thereby be achieved.

Such virtual cards are also useful in self-service kiosks and other transactions. An example is checking into a hotel. While hotels routinely employ human staff to check-in guests, they do so not solely to be hospitable. Such human interaction also serves a security purpose—providing an exchange by which guests can be informally vetted, e.g., to confirm that their stated identity is bona fide. The present technology allows such vetting to be conducted in a far more rigorous manner. Many weary travelers would be pleased to check-in via a kiosk (presenting payment card and loyalty card credentials, and receiving a mag stripe-encoded, or RFID-based, room key in return), especially if it spared them a final delay in the day's travel, waiting for a human receptionist.

Similarly, air travel can be made more secure by authenticating travelers using the technologies detailed herein, rather than relying on document inspection by a bleary-eyed human worker at shift's end. Boarding passes can similarly be made more secure by including such documents in the virtual wallet, and authenticating their validity using the presently-detailed techniques.

In the embodiment detailed in FIGS. 14 and 15, the relationship between the images was due to common geography and a common interval of time (a vacation trip to Napa). However, the relationship can be of other sorts, such as person-centric or thing-centric. For example, the reference image may be a close-up of a pair of boots worn by a friend of the user, and the related candidate images can be face shots of that friend. (Dummy images can be face shots of strangers.)

Embodiments that presented information for user review or challenge on the smartphone screen, and/or solicited user response via the smartphone keypad or touch screen, can instead be practiced otherwise. For example, information can be presented to the user on a different display, such as on a point of sale terminal display. Or it can be posed to the user verbally, as by a checkout clerk. Similarly, the user's response can be entered on a device different than the smartphone (e.g., a keypad at a checkout terminal), or the user may simply voice a responsive answer, for capture by a POS system microphone.

The artisan will recognize that spectrum-based analysis of signals (e.g., audio signals, as used above in one authentication embodiment) can be performed by filter banks, or by transforming the signal into the Fourier domain, where it is characterized by its spectral components.

As noted, security checks can be posed to the user at various times in the process, e.g., when the phone is awakened, when the payment app starts, when a card is selected, when payment is finalized, etc. The check may seek to authenticate the user, the user device, a computer with which the device is communicating, etc. The check may be required and/or performed by software in the device, or by software in a cooperating system. In addition to PIN and password approaches, these can include checks based on user biometrics, such as voice recognition and fingerprint recognition. In one particular embodiment, whenever the payment module is launched, a screen-side camera on the user's smartphone captures an image of the user's face, and checks its features against stored reference features for the authorized user to confirm the phone is not being used by someone else. Another form of check is the user's custody of a required physical token (e.g., a particular car key), etc.

Location information (e.g., GPS, cell tower triangulation, etc.) can also be utilized to confirm placement of the associated mobile device within proximity of the cooperating device. High confidence on location can be achieved by relying on network-provided location mechanism from companies such as Locaid, that are not susceptible to application hacking on the mobile device (enabled by unlocking the device or otherwise.)

If a smartphone transaction fails, e.g., because the context information provided from the smartphone to the cooperating system does not match what is expected, or because the user fails multiple consecutive attempts to provide a proper PIN code or pass another security check, a report of the failed transaction can be sent to the authorized user or other recipient. Such a report, e.g., by email or telephone, can include the location of the phone when the transaction failed, as determined by a location-sensing module in the phone (e.g., a GPS system).

Although the focus of this disclosure has been on arrangements that make no use of plastic wallet cards, some of the technology is applicable to such cards.

For example, a plastic chip card can be equipped with one or more MEMS sensors, and these can be used to generate context-dependent session keys, which can then be used in payment transactions in the manners described above in connection with smartphones.

Moreover, plastic cards can also be useful in enrolling virtual cards in a smartphone wallet. One particular such technology employs interaction between printable conductive inks (e.g., of metal oxides), and the capacitive touch screens commonly used on smartphones and tablets. As detailed in publications by Printechnologics Gmbh and others, when a card printed with a pattern of conductive ink is placed on a touch screen, the touch screen senses the pattern defined by the ink and can respond accordingly. (See, e.g., patent publications WO2012136817, WO2012117046, US20120306813, US20120125993, US20120306813 and US20110253789. Such technology is being commercialized under the Touchcode brand name. Each of the above patent documents is hereby incorporated herein by reference in its entirety.)

Loading the card into the digital wallet can involve placing the mobile wallet software in an appropriate mode (e.g., "ingest"), after optional authentication has been completed. The user then places the physical card on the smartphone display. The use of conductive inks on the card serves to identify the card to the mobile device. The user can then lift the card off the display, leaving a virtualized representation of the card on the display to be subsequently stored in the wallet, with the opportunity to add additional metadata to facilitate transactions or preferences (PIN's, priority, etc.).

Such physical item-based interaction with touch screens can also be used, e.g., during a challenge-response stage of a transaction. For example, a cooperating device may issue a challenge through the touch-screen on the mobile device as an alternative to (or in addition to) audio, image, wireless, or other challenge mechanisms. In one particular arrangement, a user places a smartphone screen-down on a reading device (similar to reading a digital boarding-pass at TSA checkpoints). The cooperating device would have a static or dynamic electrical interconnect that could be used to simulate a multi-touch events on the mobile device. By so doing, the mobile device can use the challenge (presented as a touch event) to inform the transaction and respond appropriately to the cooperating device.

While reference has been made to smartphones and POS terminals, it will be recognized that this technology finds utility with all manner of devices—both portable and fixed. Tablets, portable music players, desktop computers, laptop computers, set-top boxes, televisions, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 5; smartphones following Google's Android specification (e.g., the Galaxy S III phone, manufactured by Samsung, and the Motorola Droid Razr HD Maxx phone), and Windows 8 mobile phones (e.g., the Nokia Lumia 920).

Details of the Apple iPhone, including its touch interface, are provided in Apple's published patent application 20080174570.

Details of the Cover Flow fliptych interface used by Apple are provided in published patent application 20080062141.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

The processes and system components detailed in this specification may be implemented as instructions for computing devices, including general purpose processor instructions for a variety of programmable processors, including microprocessors (e.g., the Intel Atom, the ARM A5, the nVidia Tegra 4, and the Qualcomm Snapdragon), graphics processing units (GPUs, such as the nVidia Tegra APX 2600, and the Adreno 330—part of the Qualcomm Snapdragon processor), and digital signal processors (e.g., the Texas Instruments TMS320 series devices and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of content signal data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. In addition, libraries that allow mathematical operations to be performed on encrypted data can be utilized to minimize when and how sensitive information is stored in clear-text. Smartphones and other devices according to certain implementations of the present technology can include software modules for performing the different functions and acts.

Known browser software, communications software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of fingerprint and watermark data from content is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

(In like fashion, description of data being stored on a particular device is also exemplary; data can be stored anywhere: local device, remote device, in the cloud, distributed, etc. Thus, while an earlier embodiment employed user photographs stored in the phone, the detailed methods can similarly make use of user photographs stored in an online/cloud repository.)

Many of the sensors in smartphones are of the MEMS variety (i.e., Microelectromechanical Systems). Most of these involve tiny moving parts. Such components with moving parts may be termed motive-mechanical systems.

This specification details a variety of embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. However, implementation of all such combinations is straightforward to the artisan from the provided teachings.

Elements and teachings within the different embodiments disclosed in the present specification are also meant to be exchanged and combined.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

The present specification should be read in the context of the cited references. (The reader is presumed to be familiar with such prior work.) Those references disclose technologies and teachings that the inventors intend be incorporated into embodiments of the present technology, and into which the technologies and teachings detailed herein be incorporated.

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.)

In view of the wide variety of embodiments to which the principles and features discussed above can be applied, it should be apparent that the detailed embodiments are illustrative only, and should not be taken as limiting the scope of the invention. Rather, we claim as our invention all such modifications as may come within the scope and spirit of the following claims and equivalents thereof.

What is claimed is:

1. A method for device to device communication using displayed imagery, said method employing a first device comprising a camera and one or more processors, said method comprising:
    capturing a plurality of image frames with the camera, the plurality of image frames representing a plurality of graphics displayed on a display screen of a second device, in which display of the plurality of graphics comprises animation, and in which each of the plurality of graphics comprises an output from an erasure code generator, in which the erasure code generator produces a plurality of outputs corresponding to a payload;
    using the one or more processors for:
        analyzing the plurality of image frames to decode outputs from the plurality of graphics; and
        reconstructing the payload from decoded outputs; and
        utilizing the payload to carry out an action.

2. The method of claim 1 in which the erasure code generator comprises a fountain code generator.

3. The method of claim 1 in which each of the graphics comprises an output encoded therein with digital watermarking, and wherein said analyzing utilizes digital watermark detection to decode the outputs from the plurality of graphics.

4. The method of claim 1 in which only one output of the plurality of outputs is embedded in any one graphic of the plurality of graphics.

5. The method of claim 1 in which the plurality of outputs comprises a subset of a total number of outputs provided by the erasure code generator.

6. The method of claim 1 in which the first device comprises a smartphone or point of sale system, and the second device comprises a wrist watch or a second smartphone.

7. A system to facilitate device to device communication, comprising:
    i. A portable device comprising:
        a touch screen display;
        an input;
        memory comprising a payload; and
        one or more electronic processors configured for:
            processing the payload with an erasure code generator, in which the erasure code generator produces a plurality of outputs corresponding to the payload;
            obtaining a plurality of graphics;
            embedding one of the plurality of outputs in one of the plurality of graphics and proceeding with embedding until each of the plurality of outputs is so embedded, respectively, in a graphic of the plurality of graphics; and
            causing the touch screen display to display embedded graphics of the plurality of graphics; and
    ii. A capture device comprising:
        a camera for capturing imagery of said touch screen display;
        one or more processors configured for:
            analyzing captured imagery representing displayed embedded graphics to decode outputs from the plurality of graphics;
            reconstructing the payload from decoded outputs; and
            utilizing the payload to carry out an action.

8. The system of claim 7 in which the erasure code generator comprises a fountain code generator.

9. The system of claim 7 in which only one output of the plurality of outputs is embedded in any one graphic of the plurality of graphics.

10. The system of claim 7 in which the plurality of outputs comprises a subset of a total number of outputs provided by the erasure code generator.

11. The system of claim 7 in which the erasure code generator comprises a fountain code generator, in which the fountain code generator produces the plurality of outputs, from which said capture device's one or more processors can reassemble the payload by obtaining a subset of the plurality of outputs, the subset being less than the plurality of outputs.

12. The system of claim 7 in which the portable device comprises a wrist watch or smart phone.

13. The system of claim 7 in which display of the embedded graphics comprises animation.

14. The system of claim 7 in which the embedding comprises digital watermarking.

15. The system of claim 7 in which the embedded graphics are displayed so as to create a static image effect.

16. An apparatus comprising:
a camera for capturing imagery; and
one or more processors configured for:
analyzing a plurality of image frames captured with said camera, the plurality of image frames representing a plurality of graphics displayed on a display screen of a portable device, in which the plurality of graphics are displayed on the display screen so as to create a static image effect, and in which each of the graphics comprises an output from an erasure code generator, and in which the erasure code generator produces a plurality of outputs corresponding to a payload;
analyzing the plurality of image frames to decode outputs from the plurality of graphics;
reconstructing the payload from decoded outputs; and
utilizing the payload to carry out an action.

17. The apparatus of claim 16 in which each of the graphics comprises an output carried with digital watermarking, and in which said analyzing the plurality of image frames utilizes digital watermark detection to decode outputs from the plurality of graphics.

18. The apparatus of claim 16 in which said reconstructing the payload reconstructs the payload by obtaining a subset of the plurality of outputs, the subset being less than the plurality of outputs.

19. The apparatus of claim 16 in which the portable device comprises a wrist watch or a smart phone.

20. A non-transitory computer readable medium comprising instructions stored therein that, when executed by one or more processors of a first device, cause the one or more processors to perform acts including:
obtaining a plurality of image frames captured with a camera of the first device, the plurality of image frames representing a plurality of graphics displayed on a display screen of a second device, in which display of the plurality of graphics comprises animation, and in which each of the plurality of graphics comprises an output from an erasure code generator, in which the erasure code generator produces a plurality of outputs corresponding to a payload;
analyzing the plurality of image frames to decode outputs from the plurality of graphics; and
reconstructing the payload from decoded outputs; and
utilizing the payload to carry out an action.

21. The non-transitory computer readable medium of claim 20 in which each of the graphics comprises an output encoded therein with digital watermarking, and wherein said analyzing utilizes digital watermark detection to decode the outputs from the plurality of graphics.

22. The non-transitory computer readable medium of claim 21 in which only one output of the plurality of outputs is embedded in any one graphic of the plurality of graphics.

23. The non-transitory computer readable medium of claim 20 in which the plurality of outputs comprises a subset of a total number of outputs provided by the erasure code generator.

24. The non-transitory computer readable medium of claim 20 in which the first device comprises a smartphone or point of sale system, and the second device comprises a wrist watch or a second smartphone.

* * * * *